US009606945B2

(12) United States Patent
Yoshida et al.

(10) Patent No.: US 9,606,945 B2
(45) Date of Patent: Mar. 28, 2017

(54) ACCESS CONTROLLER, ROUTER, ACCESS CONTROLLING METHOD, AND COMPUTER PROGRAM

(71) Applicant: Panasonic Corporation, Osaka (JP)

(72) Inventors: Atsushi Yoshida, Osaka (JP); Satoru Tokutsu, Saitama (JP); Tomoki Ishii, Kyoto (JP); Takao Yamaguchi, Osaka (JP); Nobuyuki Ichiguchi, Osaka (JP)

(73) Assignee: Panasonic Intellectuasl Property Management Co., Ltd., Osaka (JP)

( * ) Notice: Subject to any disclaimer, the term of this patent is extended or adjusted under 35 U.S.C. 154(b) by 379 days.

(21) Appl. No.: 14/246,468

(22) Filed: Apr. 7, 2014

(65) Prior Publication Data

US 2014/0223053 A1 Aug. 7, 2014

Related U.S. Application Data

(63) Continuation of application No. PCT/JP2013/004667, filed on Aug. 1, 2013.

(30) Foreign Application Priority Data

Aug. 13, 2012 (JP) .................................. 2012-179477

(51) Int. Cl.
*H04J 3/02* (2006.01)
*G06F 13/16* (2006.01)
*G06F 13/362* (2006.01)
(52) U.S. Cl.
CPC ........ *G06F 13/1689* (2013.01); *G06F 13/362* (2013.01)
(58) Field of Classification Search
CPC ........................... G06F 13/1689; G06F 13/326
See application file for complete search history.

(56) References Cited

U.S. PATENT DOCUMENTS

2002/0194350 A1* 12/2002 Lu ........................... H04L 29/06
   709/229
2006/0203721 A1* 9/2006 Hsieh .................. H04L 12/4633
   370/229

(Continued)

FOREIGN PATENT DOCUMENTS

JP     2007-510345 T    4/2007
JP        4485574 B    4/2010

(Continued)

OTHER PUBLICATIONS

International Search Report for corresponding International Application No. PCT/JP2013/004667 mailed Nov. 5, 2013.

(Continued)

*Primary Examiner* — Abdelnabi O Musa
(74) *Attorney, Agent, or Firm* — Renner, Otto, Boisselle & Sklar, LLP.

(57) ABSTRACT

The access controller conducts arbitration between first nodes, each of which is attempting to transmit data to any of second nodes as destinations through a network of buses. The access controller includes: a buffer which receives the data that have been provided by the first nodes with mutually different required qualities and destinations, classifies the data according to their destinations and required qualities, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

13 Claims, 27 Drawing Sheets

(56) References Cited

U.S. PATENT DOCUMENTS

| | | | |
|---|---|---|---|
| 2007/0081515 A1* | 4/2007 | Dielissen | H04L 12/5693 370/351 |
| 2009/0313441 A1* | 12/2009 | Mochida | G06F 13/1663 711/150 |
| 2012/0072635 A1 | 3/2012 | Yoshida et al. | |

FOREIGN PATENT DOCUMENTS

| | | |
|---|---|---|
| JP | 4880802 B | 12/2011 |
| WO | WO 2012/029215 A1 | 3/2012 |
| WO | WO 2013/073172 A1 | 5/2013 |

OTHER PUBLICATIONS

Kees Goossens et al., "AEthereal Network on Chip Concepts, Architectures, and Implementations", IEEE Design & Test of Computers, vol. 22, Issue 5, Sep. 26, 2005, pp. 414-421 [online] internet <retrieval date: Oct. 23, 2013>.

John Dielissen et al., "Concepts and Implementation of the Philips Network-on-Chip" IP-Based SOC Design, 2003, pp. 1-6, [online]internet<retrieval date: Oct. 24, 2013>.

T. Bjerregaard et al., "A Survey of Research and Practices of Network-on-Chip", ACM Computing Surveys, vol. 38, No. 1, pp. 1-51, Mar. 2006 (cited in [0066] of the specification).

Co-pending U.S. Appl. No. 14/156,912, filed Jan. 16, 2014.

\* cited by examiner

FIG.6

| CLASS | REQUIRED QUALITY | EXAMPLE |
|---|---|---|
| DELAY-GUARANTEED CLASS | TRANSMISSION NEEDS TO BE COMPLETED WITHIN PERMITTED TIME DELAY | VIDEO / AUDIO PROCESSING |
| PROCESSOR CLASS | TRANSMISSION RATE AT LEAST AS HIGH AS PREDETERMINED RATE IS GUARANTEED / REQUIRED RATE CANNOT BE DEFINED / TOTAL QUANTITY OF ACCESS REQUEST VARIES | CPU |
| RATE-GUARANTEED CLASS | TRANSMISSION RATE NEEDS TO BE GUARANTEED ON AVERAGE | IMAGE FILTER |
| BEST-EFFORT CLASS | NONE | GPU |

FIG.12

| BUS MASTER'S ID (IDENTIFICATION INFORMATION) | QUALITY CLASS |
|---|---|
| 00 | DELAY-GUARANTEED CLASS |
| 01 | DELAY-GUARANTEED CLASS |
| 02 | DELAY-GUARANTEED CLASS |
| 03 | PROCESSOR CLASS |
| 04 | RATE-GUARANTEED CLASS |
| 05 | RATE-GUARANTEED CLASS |
| 06 | BEST-EFFORT CLASS |
| ⋮ | ⋮ |

| CLASS | DESTINATION | GUARANTEE FLAG | TRANSMISSION QUANTITY |
|---|---|---|---|
| PROCESSOR | MEMORY 1 | 0 | 3 |
| | MEMORY 2 | 1 | 0 |
| RATE-GUARANTEED | MEMORY 1 | 1 | 0 |
| | MEMORY 2 | 0 | 2 |

GUARANTEE FLAG VALUE
0: DATA HAS NOT BEEN TRANSMITTED YET TO THE QUANTITY DEFINED BY GUARANTEED RATE
1: DATA HAS ALREADY BEEN TRANSMITTED TO THE QUANTITY DEFINED BY GUARANTEED RATE

| QUALITY CLASS | GUARANTEED RATE VALUE |
|---|---|
| DELAY-GUARANTEED CLASS | 30 |
| PROCESSOR CLASS | 20 |
| RATE-GUARANTEED CLASS | 10 |

*FIG.23*

|  | APPLIED IF | ORDER OF ARBITRATION | |
|---|---|---|---|
|  |  | 1 | 2 |
| RULE 1 | THERE ARE ACCESS REQUESTS OF WHICH PRIORITY LEVELS ARE AT LEAST AS HIGH AS PROCESSOR CLASS' | INTER-CLASS ARBITRATION | INTER-DESTINATION ARBITRATION |
| RULE 2 | THERE ARE NO ACCESS REQUESTS OF WHICH PRIORITY LEVELS ARE AT LEAST AS HIGH AS PROCESSOR CLASS' | INTER-DESTINATION ARBITRATION | INTER-CLASS ARBITRATION |

FIG.26

| ITEM | VALUE |
|---|---|
| PRECEDENT ACCESS NUMBER | 1 |

ACCESS CONTROLLER, ROUTER, ACCESS CONTROLLING METHOD, AND COMPUTER PROGRAM

This is a continuation of International Application No. PCT/JP2013/004667, with an international filing date of Aug. 1, 2013, which claims priority of Japanese Patent Application No. 2012-179477, filed on Aug. 13, 2012, the contents of which are hereby incorporated by reference.

BACKGROUND

1. Technical Field

The present application relates to an access controller which conducts arbitration between a number of bus masters that are attempting to access the same slave through a network of semiconductor buses.

2. Description of the Related Art

Some semiconductor integrated circuits have a system in which a bus master that needs to have a guaranteed access to a memory at a constant rate (which will be referred to herein as a "rate-guaranteed-class bus master") and a bus master that issues a request to access the memory irregularly (which will be referred to herein as a "processor-class bus master") share the same memory.

In such a system, it is difficult to predict exactly when the processor-class bus master issues an access request. That is why such a system needs a circuit for conducting arbitration to avoid contention between the access request issued by the rate-guaranteed-class bus master and the access request issued by the processor-class bus master. Some people disclosed a technique for providing an access controller which enables such an arbitrating circuit to respond much more quickly to that hardly predictable access request issued by the processor-class bus master.

For example, Japanese Patent No. 4485574 supposes a situation where while a rate-guaranteed-class bus master is accessing a shared memory, there is some transmission band available and the next access request is issued. According to the technique disclosed in Japanese Patent No. 4485574, by getting a preceding access done at a rate exceeding the one that has been set originally for the rate-guaranteed-class bus master, a margin is left for the next access to be carried out periodically. With such a margin left, when such a hardly predictable access request is issued by the processor-class bus master, the transmission band that has been allocated in advance to the rate-guaranteed-class bus master is shifted to the processor-class bus master. In this manner, such an almost unpredictable access request by the processor-class bus master can be responded to much more quickly, and therefore, the access can get done with a shorter time delay.

SUMMARY

The prior art technique needs further improvement of an access controller which conducts arbitration between a number of nodes (such as bus masters) that have mutually different levels of required qualities and that are attempting to access a particular node (such as a shared memory) should have its flexibility expanded in terms of the number and arrangement of bus masters.

A non-limiting exemplary embodiment of the present application provides an access controller which can transmit data with a shorter time delay by responding instantly to access requests from multiple bus masters that require various levels of qualities.

To overcome the problem described above, an aspect of the present invention provides an access controller which conducts arbitration between a plurality of first nodes, each of which is attempting to transmit data to any of a plurality of second nodes as destinations through a network of buses. The access controller includes: a buffer which receives the data that have been provided by the plurality of first nodes with mutually different required qualities and destinations, classifies the data according to their destinations and required qualities, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

According to the above aspect, it is possible to cope highly flexibly with any change in the arrangement or number of bus masters. Thus, when arbitration needs to be conducted between a plurality of first nodes (such as bus masters) which require mutually different levels of qualities and which are attempting to access the same second node (such as a slave), data can be transmitted with a short time delay by instantly responding to access requests from those bus masters that require various levels of qualities (such as processors and graphics processors) at a rate that is equal to or higher than a guaranteed one.

This general and particular aspect can be implemented as a system, a method, a computer program or a combination thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 48 shows the flow of operation of the conventional router.

FIG. 6 shows the definitions of required quality classes.

FIG. 12 shows an exemplary classification rule 1101.

FIG. 23 shows the information to be stored in the arbitration rule storage 911.

FIG. 26 shows the information to be stored in the precedent access storage 2501.

Figure 28:
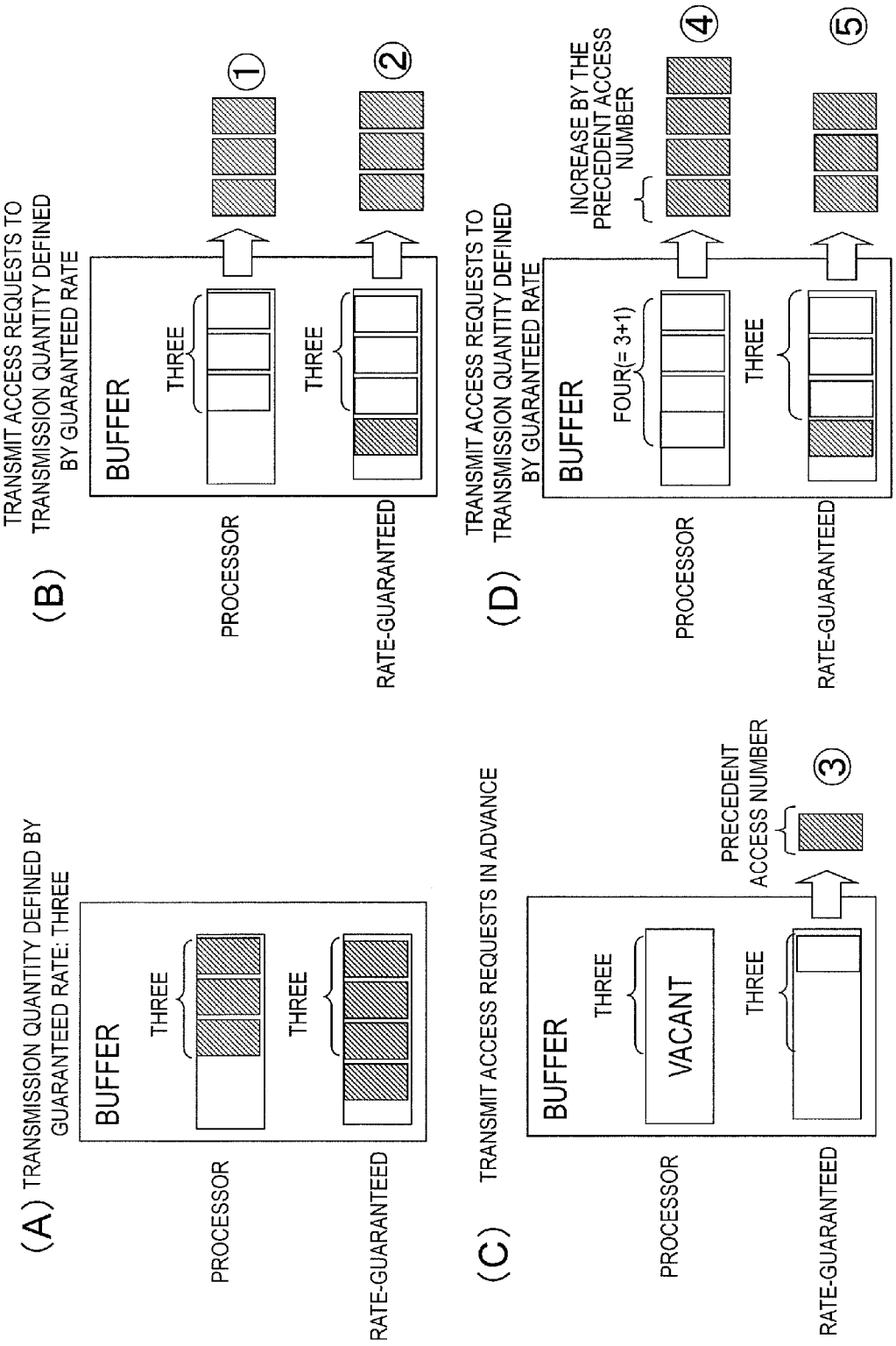

Portions (A) through (D) of FIG. 28 illustrate how the time delay involved with the processor class can be cut down by allocating the transmission quantity of the access requests that have been transmitted in advance for the rate-guaranteed class to the transmission quantity of the access requests to be transmitted later for the processor class.

Figure 29:
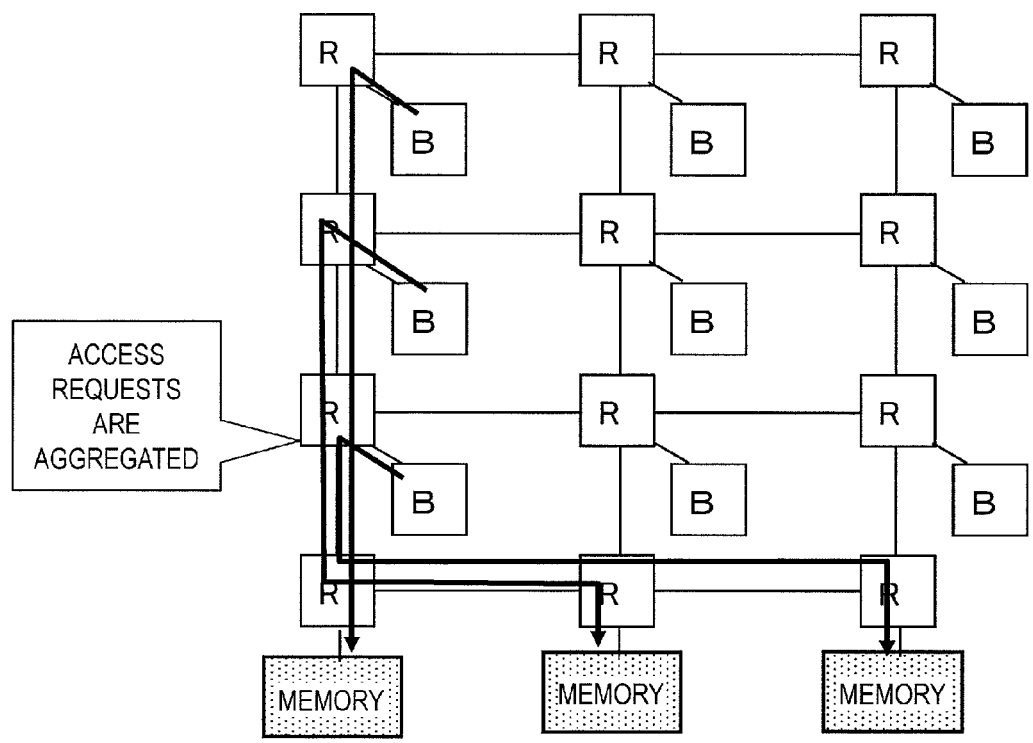

FIG. 29 illustrates an exemplary mesh-type topology which is used generally.

DETAILED DESCRIPTION

A conventional access controller manages respective access requests independently on a bus master basis, and therefore, buffers and circuits need to be provided independently for respective bus masters and arbitration needs to be conducted on a bus master basis, even if their required qualities are the same. That is why if the arrangement or number of bus masters needs to be changed on a semiconductor integrated circuit, the circuit needs to be changed in the conventional access controller. In addition, as it takes a longer and longer time to get arbitration processing done as the number of bus masters increases, the time delay to be caused by the arbitration processing also increases.

Thus, the present inventors invented an access controller which can minimize such a circuit change and a time delay involved with the arbitration processing by adopting the following configurations. Specifically, an aspect of the present invention can be outlined as follows:

An access controller according to an aspect of the present invention conducts arbitration between a plurality of first nodes, each of which is attempting to transmit data to any of a plurality of second nodes as destinations through a network of buses. The access controller includes: a buffer which receives the data that have been provided by the plurality of first nodes with mutually different required qualities and destinations, classifies the data according to their destinations and required qualities, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

In one embodiment, the inter-destination arbitrator further selects the data to be transmitted so as to distribute the transmission quantities of the data with the required qualities that have been selected by the inter-class arbitrator as uniformly as possible.

In another embodiment, with respect to the data, of which the destinations have been selected by the inter-destination arbitrator, the inter-class arbitrator sequentially selects one of the required qualities of the data after another in the order of their severity.

In another embodiment, the data with the mutually different required qualities include a first set of data with a relatively low level of required quality and a second set of data with a relatively high level of required quality. The access controller further includes: a used band measurement section which measures the transmission quantity of the first set of data; and a precedent access storage which stores the transmission quantity of the first set of data that has been transmitted in advance at a rate exceeding the one guaranteed for the first set of data. And the transmission controller which allocates the transmission quantity to the second set of data by reference to the transmission quantity that is stored in the precedent access storage.

In another embodiment, the data with the mutually different required qualities include at least processor-class data and rate-guaranteed-class data.

In another embodiment, the required quality level of the processor class is set to be higher than that of the rate-guaranteed class.

In another embodiment, if there is any data, of which the required quality level is equal to or higher than that of the processor class, is in the buffer, the transmission controller transmits data, of which the required qualities have been selected by the inter-class arbitrating and then of which the transmission quantities have been selected by the inter-destination arbitrator so as to be as uniform as possible between plurality of destinations. But if there is no data, of which the required quality level is equal to or higher than that of the processor class, is in the buffer, the transmission controller transmits data, which have had their destinations selected by the inter-destination arbitrator and then have been selected by the inter-class arbitrator in the order of severity of their required qualities.

In another embodiment, the inter-destination arbitrator controls the transmission quantities of the data to the respective destinations so as to avoid causing transmission of the data to the respective destinations to wait.

In another embodiment, the inter-destination arbitrator controls the transmission quantities of the data to the respective destinations with a bias in transmission quantity permitted between the data to the respective destinations.

A router according to another aspect of the present invention conducts arbitration between a plurality of first nodes, each of which is attempting to transmit data to any of a plurality of second nodes as destinations through a network of buses. The router includes: a buffer which receives the data that have been provided by the plurality of first nodes with mutually different required qualities and destinations, classifies the data according to their destinations and required qualities, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

A network interface controller according to still another aspect of the present invention is connected to an access controller which conducts arbitration between a plurality of first nodes, each of which is attempting to transmit data to any of a plurality of second nodes as destinations through a network of buses. The network interface controller includes: a buffer which receives the data that have been provided by predetermined first nodes with mutually different required qualities and destinations, classifies the data according to their destinations and required qualities, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

A memory controller according to yet another aspect of the present invention is connected to an access controller which conducts arbitration between a plurality of first nodes, each of which is attempting to transmit data to any of a plurality of second nodes as destinations through a network of buses. The memory controller includes: a buffer which receives the data that have been provided by the plurality of first nodes with mutually different required qualities, classifies the data according to their required qualities and their sources that are the first nodes, and stores the classified data separately; an inter-class arbitrator which sequentially selects one of the required qualities of the data after another in the order of their severity; an inter-destination arbitrator which selects the destinations of the data to be transmitted and gets the transmission quantities of the data distributed among the destinations; and a transmission controller which controls transmission of the data based on the required qualities selected by the inter-class arbitrator and the destinations selected by the inter-destination arbitrator.

An access controlling method according to yet another aspect of the present invention is method for controlling an access controller which conducts arbitration between a plurality of first nodes, each of which is attempting to transmit data to any of a plurality of second nodes as destinations through a network of buses. The method includes: receiving the data that have been provided by the plurality of first nodes with mutually different required qualities and destinations; classifying the data according to their destinations and required qualities and storing the classified data in a buffer separately; sequentially selecting one of the required qualities of the data after another in the order of their severity; selecting the destinations of the data to be transmitted and getting the transmission quantities of the data distributed among the destinations; and controlling transmission of the data based on the required qualities selected in the step of selecting the required qualities and the destinations selected in the step of selecting the destinations.

A computer program according to yet another aspect of the present invention is designed to carry out a simulation for an access controller which conducts arbitration between a plurality of first nodes, each of which is attempting to transmit data to any of a plurality of second nodes as destinations through a network of buses. The computer program is defined to make a computer carry out the access controlling method described above.

Hereinafter, an access controller and a designing and verification method for implementing the access controller on a chip will be described as exemplary embodiments of the present invention.

Figure 1:
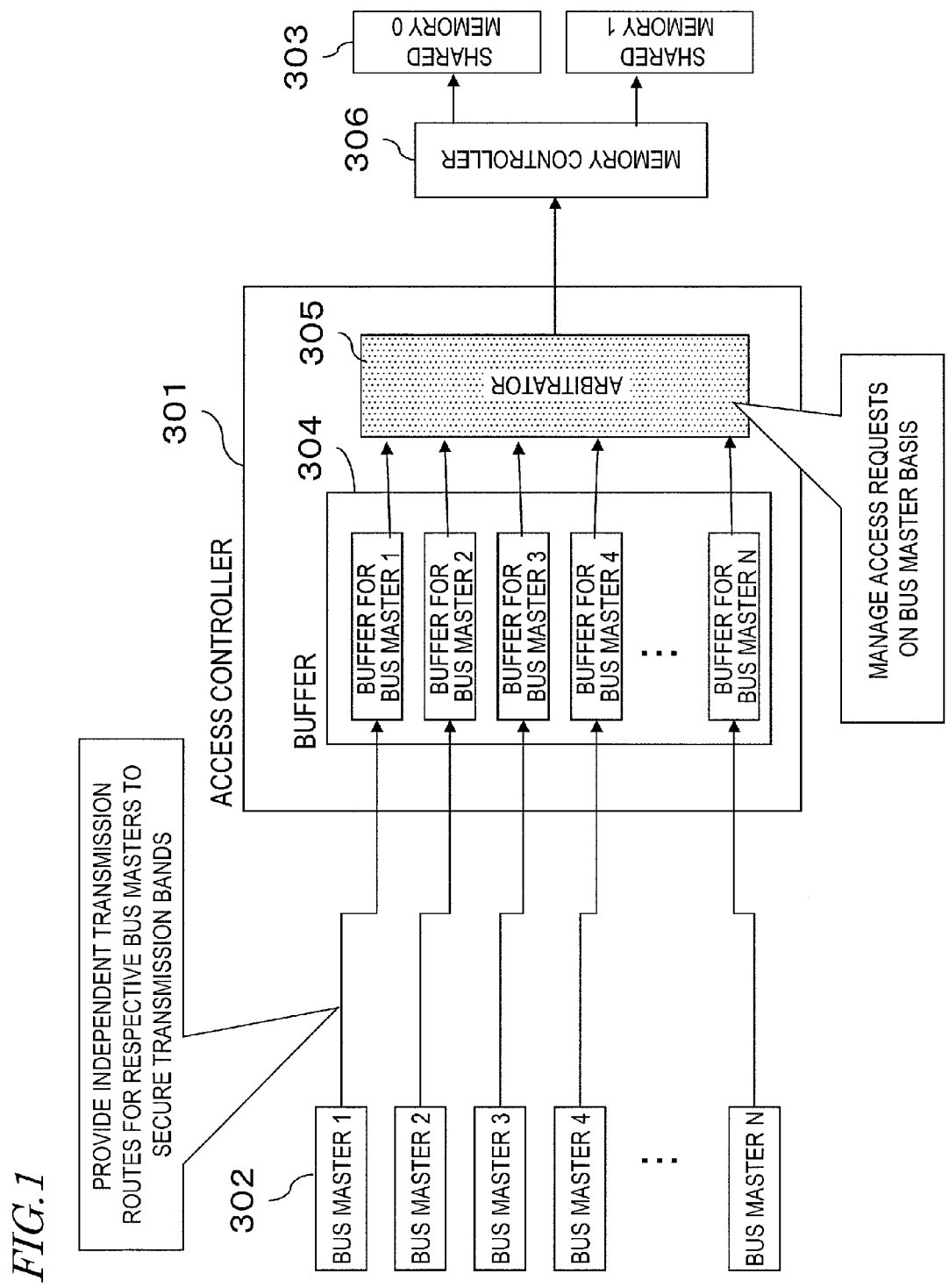
FIG. 1 illustrates generally how a conventional access controller works.
Figure 2:
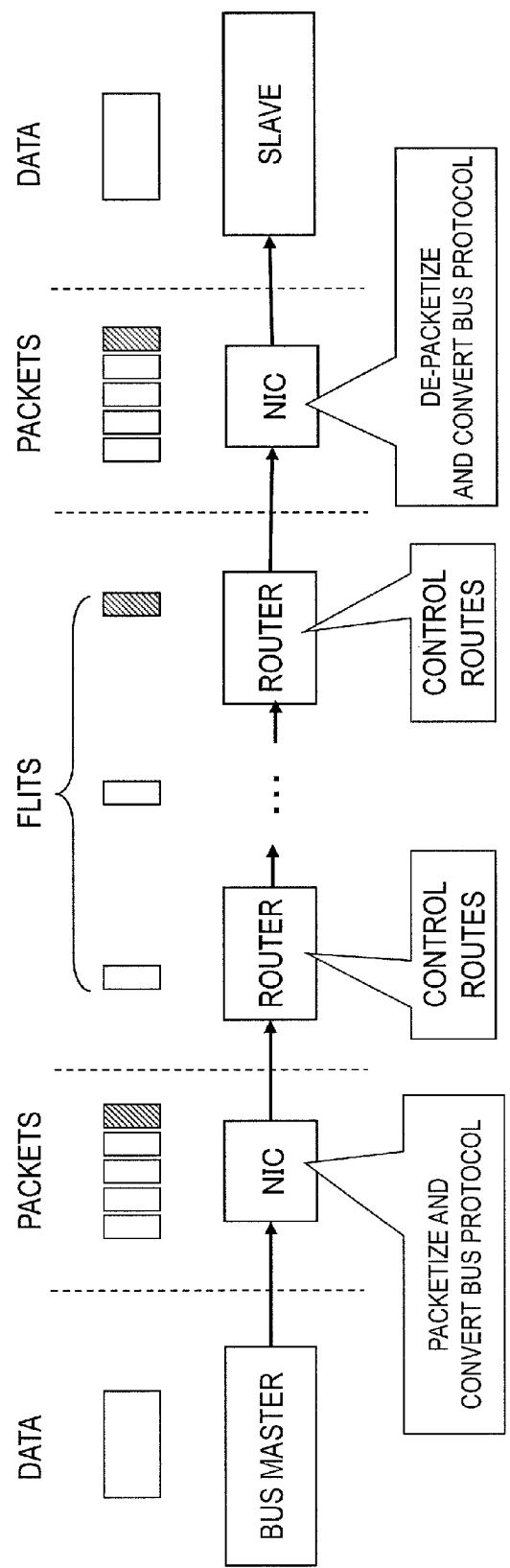
FIG. 2 illustrates generally how an NoC works.
Figure 3:
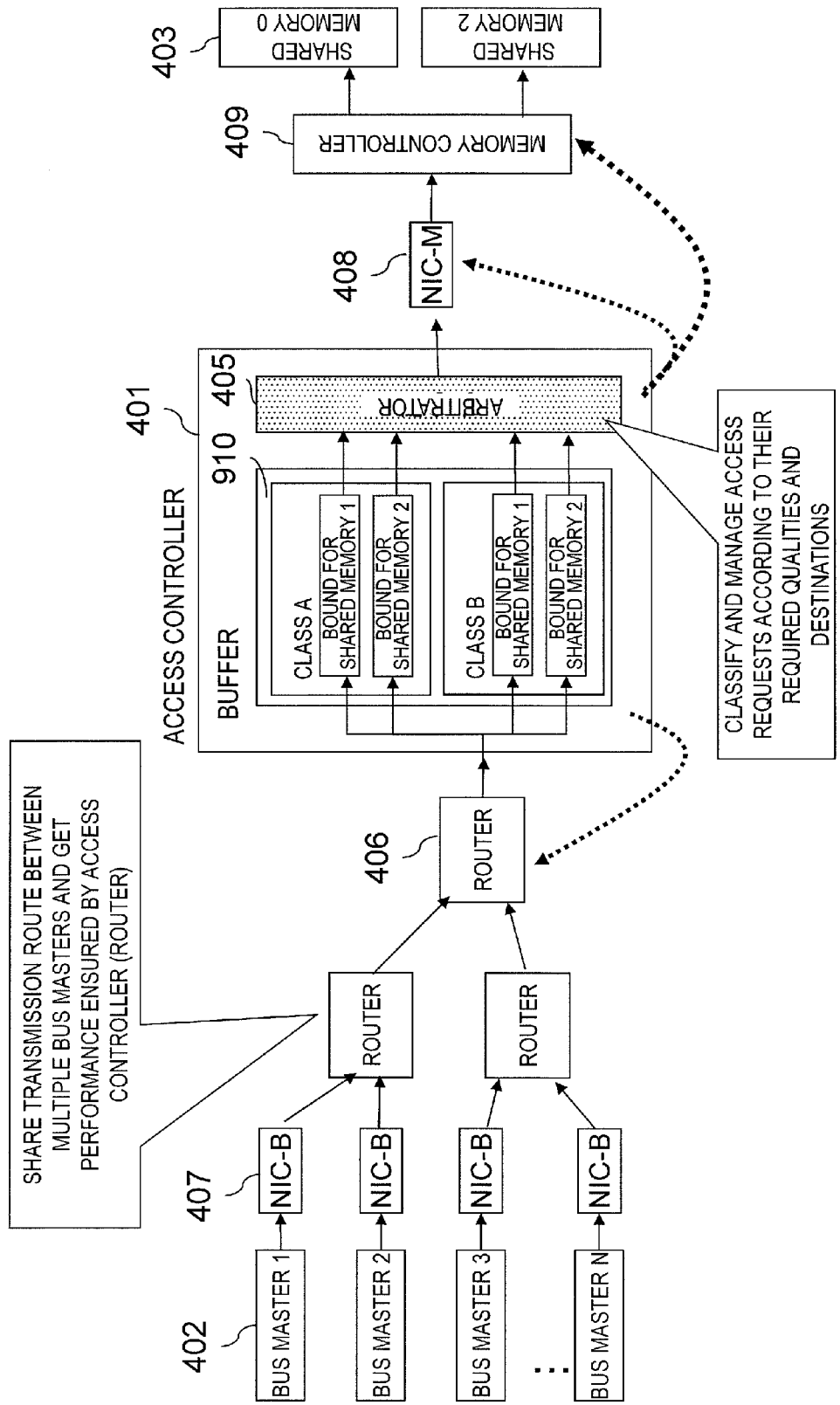
FIG. 3 illustrates generally how an access controller according to an exemplary embodiment of the present invention works.

Before those embodiments are described, however, the problems to be solved by an exemplary embodiment of the present invention disclosed in this description will be outlined with reference to FIGS. 1 through 3.

First of all, FIG. 1 illustrates generally how a conventional access controller works.

This access controller 301 conducts arbitration between a plurality of bus masters 302, all of which are attempting to access the same shared memory 303. The memory controller 306 performs a flow control with respect to the shared memory 303 and allocates data storage locations (such as banks or addresses) in the shared memory. The access controller 301 is arranged between the bus masters 302 and the memory controller 306.

The conventional access controller 301 has independent transmission routes which lead from the respective bus masters 302 to the shared memory 303. As a result, transmission bands are guaranteed in response to the access requests from the respective bus masters 302. Also, those access requests from the respective bus masters 302 are managed independently of each other by buffers 304 which are provided for the respective bus masters 302. That is why the arbitrator 305 can directly compare the access requests from all of those bus masters to each other simultaneously. And the arbitrator 305 can select the best access request that satisfies the performance requirements for all of those bus masters and can transmit the access request to the shared memory.

According to the conventional technologies, however, even bus masters with the same required quality need independent transmission routes, circuits and buffers to process their access requests, and arbitration should also be done on a bus master basis. That is why if there are a large number of bus masters, the access request management section 304 and the arbitrator 305 should have their circuit sizes increased, and it takes a longer time for the arbitrator 305 to get the arbitration done. On top of that, the configurations of the access request management section 304 and arbitrator 305 should also be changed whenever the arrangement or number of the bus masters 302 is changed.

As can be seen, the conventional access controller 301 cannot cope flexibly with a change of the arrangement or number of bus masters, and therefore, it becomes increasingly difficult to apply the conventional access controller 301 as the scale of semiconductor systems increases.

As semiconductor systems increase their scale or improve their functionality, more and more people have been working on an NoC (Network on Chip) in which packet exchange communications are carried out via routers and through a network of buses (see, for example, T. Bjerregaard et al., "A Survey of Research and Practices of Network-on-chip", ACM Computing Surveys, Vol. 38, No. 1, pp. 1-51, 2006).

FIG. 2 illustrates generally how an NoC to be described in this description works.

A bus master is connected to routers via network interface controllers (which will be sometimes referred to herein as "NICs"). The NICs packetize data into packets and de-packetize the packets into original data.

In each packet, described is an address indicating its destination. And each router performs a route control on an address basis, thereby transferring data from the bus master to a slave.

Examples of the bus masters include DSPs, processors, GPUs and I/Os. The qualities required by the bus masters will be described later with reference to FIG. 6.

Examples of the slaves include memories (such as DRAMs, SRAMs and SDs), I/Os and processors. In this description, the slave is supposed to be a memory.

In this NoC, each router plays the role of aggregating a plurality of buses together and also functions as a bus buffer (i.e., as a repeater which divides a long route). That is why by changing the arrangement of those routers, the restriction on the arrangement of bus masters can be relaxed. In addition, by making the routers control the routes, the transmission routes can be set flexibly just by changing the arrangement of those routers and destinations without depending on the physical arrangement of bus masters. As a result, the restriction on the arrangement of bus masters can also be relaxed. Consequently, by introducing this NoC, a large-scale semiconductor integrated circuit can be developed much more easily.

FIG. 3 illustrates generally how an access controller according to an exemplary embodiment of the present invention works.

The access controller 401 receives access requests from a plurality of bus masters 402 to a shared memory 403 and holds the requests in a buffer 910. Then, an arbitrator 405 in the access controller 401 conducts arbitration between those access requests in the buffer 910 to determine in what order those requests should be transmitted to the shared memory 403.

Specifically, a device with such a function of performing access request arbitration processing, which is a core technique of the present disclosure, will be defined herein as an "access controller".

In this embodiment, a semiconductor system in which those bus masters 402 and the shared memory 403 are connected together via routers 406 is established by using an NoC. NICs-B 407 packetize the access requests that the bus masters have transmitted. On the other hand, an NIC-M 408 de-packetizes the packets that have been received from the routers 406.

The access controller 401 has the function of conducting arbitration between all bus masters that have issued the access requests, and therefore, may be built in any of the router 406, NIC-M 408 and memory controller 409 where all of those access requests are aggregated together on the transmission route (see FIG. 3). If the access controller 401 is built in the router, some function unique to the router needs to be added to the access controller. Examples of such functions include a routing function. A specific example in which the access controller 401 is built in a router will be described later.

In an NoC, a router generally includes a plurality of buffers (which are also called "virtual channels (VCs)") to store packets, and has, as its own unique relay function to deliver a packet to its destination, a routing function, a VC allocation (VA) function and a switch allocation (SA) function (see the document mentioned above, for example).

The routing function is the function of determining, based on the destination address described in a packet received, where the packet should go to next.

The VC allocation (VA) function is the function of securing dynamically a buffer (i.e., virtual channel) to store the packet at the next point on the route.

And the switch allocation (SA) function is the function of arranging the transmission schedule between a plurality of packets.

To implement the access controller 401 of this embodiment as a router, the buffer 910 of the access controller 401 uses a plurality of buffers in the router, thereby managing the access requests, while its arbitrator 405 conducts arbitration by using the switch allocation (SA) function in the router. It should be noted that since the access controller 401 has only one target, no routing function is needed. In addition, since it has been determined in advance what buffer needs to be used at the next point on the route to store the packets, no VC allocation (VA) function is needed, either.

Consequently, although the router 406 is a device that has all of those functions described above, the access controller 401 is a device that needs neither the routing function nor the VC allocation (VA) function but that includes only a buffer to store data and has the function of conducting arbitration between multiple sets of data to be transmitted, which is a major difference between the router 406 and the access controller 401.

For that reason, the configuration and operation related to the routing and VC allocation functions that the access controller 401 has nothing to do with directly will not be described in the following description.

Since a plurality of bus masters share the same transmission route in this access controller 401, the transmission performance declines due to contention between those bus masters. That is why the transmission performance of the respective bus masters needs to be ensured by the access controller 401.

To ensure the transmission performance of each bus master, no matter how many bus masters are provided, the access request management section 404 of the access controller 401 groups the access requests that have been issued by those bus masters into respective classes according to their required qualities and manages those classes. Meanwhile, the arbitrator 405 sequentially forwards those requests in the descending order of their priority levels at a predetermined rate. And if there is any unused transmission band available, the arbitrator 405 forwards those requests in the descending order of their priority levels at a rate exceeding the predetermined rate.

Also, in a situation where access requests are transmitted to multiple different destinations through the same transmission route, accesses to some destination may be overconcentrated, thus causing transmission of access requests to the other destinations to wait and increasing the time delay. Transmission of those access requests may have to wait at the routers 401 and 406, for example. For that reason, the access request management section 404 manages those access requests by classifying those requests according to their destinations, and the arbitrator 405 conducts arbitration to make the transmission quantities as uniform as possible between multiple destinations, thereby preventing the access requests from being transmitted to only some destination in an excessively increased transmission quantity, avoiding overconcentrated accesses, and cutting down the time delay. It should be noted that to avoid the overconcentration of accesses to only some destination, such a method of making the transmission quantities as uniform as possible between those destinations does not have to be adopted, but the destinations may also be selected at random to prevent accesses to only some destination from getting overconcentrated.

Furthermore, the "multiple destinations" between which the access controller conducts arbitration refer herein to the destinations to which those access requests that need to wait before being permitted to be transmitted in the access controller should be sent. That is why other destinations to which no access requests that need to wait before being permitted to be transmitted in the access controller should be sent may be removed from the objects of the arbitration.

As can be seen, the access controller 401 according to an exemplary embodiment of the present invention conducts arbitration between those access requests (data) according to their required qualities and destinations, thereby ensuring good transmission performance for respective bus masters while coping more flexibly with any change of the number of the bus masters and getting arbitration done with high responsivity while cutting down the time delay.

The technique disclosed in Japanese Patent No. 4880802 is known as a technique for controlling the transmission on a destination basis in an NoC controller. FIGS. 4A and 4B and FIGS. 5A and 5B show a difference between a conventional router and a router 406 in which the access controller of this embodiment is implemented.

Figure 4A:
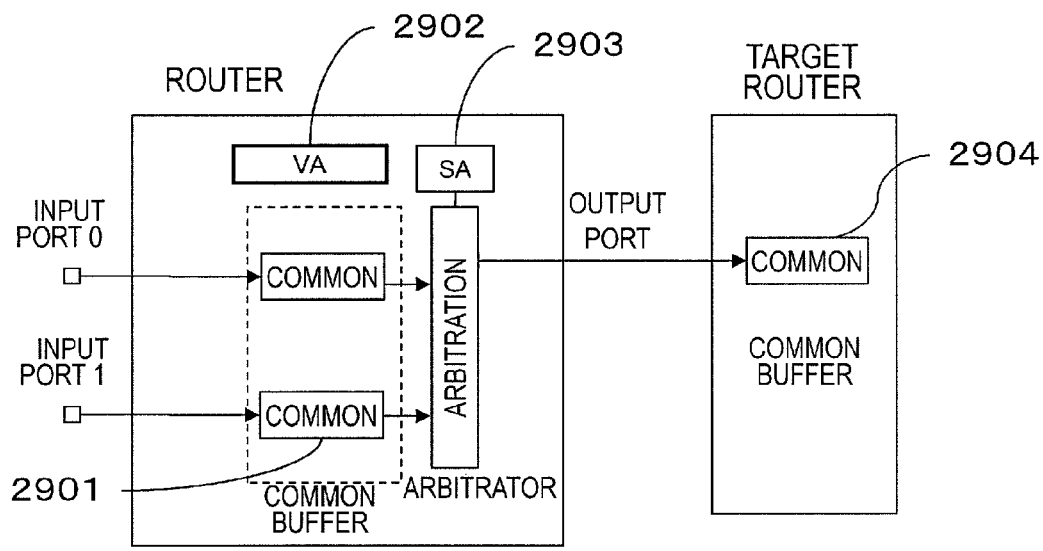
FIG. 4A illustrates a configuration for a conventional router.

FIG. 4A illustrates a configuration for a conventional router. As shown in FIG. 4A, the conventional router includes common buffers 2901 which are provided for respective input ports to store packets irrespective of their destinations, a VC allocation (VA) function 2902 for allocating the common buffers to the target router, and a switch allocation (SA) function 2903 for determining from which of the two common buffers packets need to be transmitted. Likewise, the target router also includes a common buffer 2904 which stores the packets irrespective of their destinations.

Figure 4B:
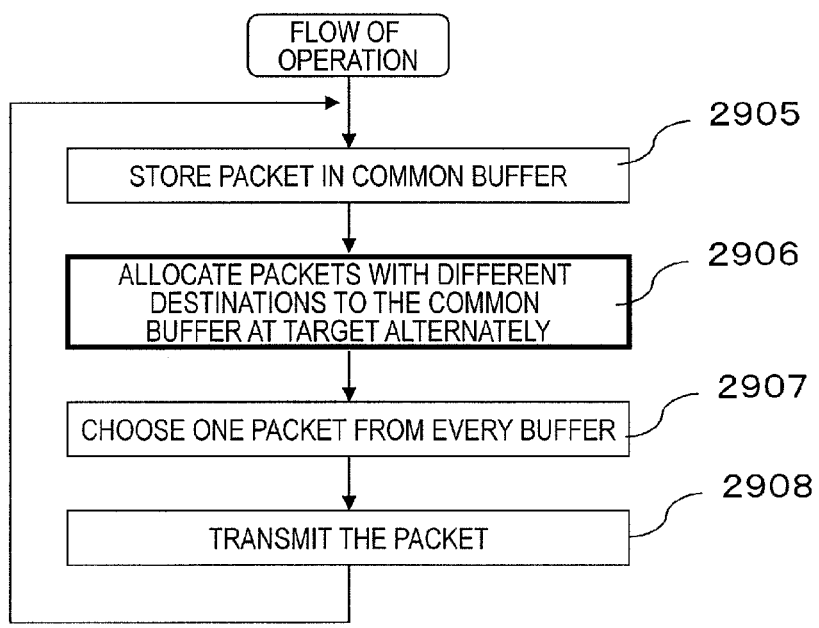

FIG. 4B shows the flow of operation of the conventional router.

First, in Step 2905, the router stores a packet received in the common buffer 2901.

Next, in Step 2906, the router chooses one of its own buffers, which is permitted to use the buffer 2904 at the target router, by using the VC allocation (VA) function 2902.

In this case, if packets with multiple different destinations are stored in its own common buffers 2901, the conventional VC allocation function gives permission to use the common buffer 2904 at the target router to the two common buffers 2901 alternately, thereby avoiding giving the permission to use the common buffer 2904 to packets with the same destination continuously.

Then, in Step 2907, the router chooses one packet to transmit by using the switch allocation (SA) function 2903.

And in Step 2908, the router transmits the packet chosen.

Figure 5A:
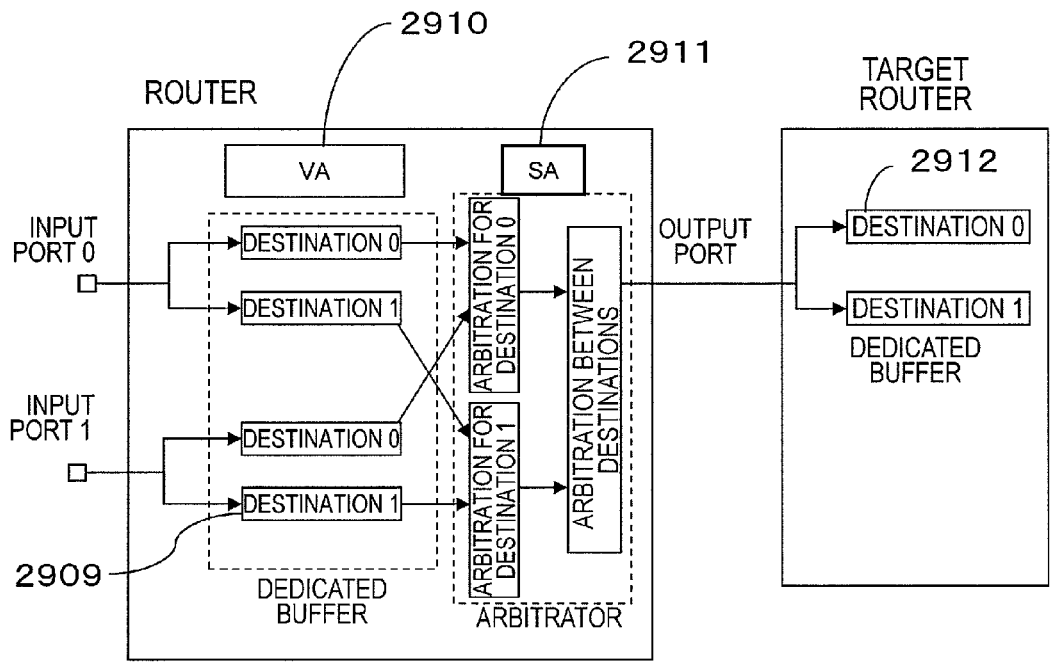
FIG. 5A illustrates a configuration for a router according to an exemplary embodiment.

FIG. 5A illustrates a configuration for a router according to this embodiment.

The router of this embodiment includes dedicated buffers 2909 which classify the packets according to their destinations on an input port basis, a control circuit 2910 which performs a VC allocation (VA) function for allocating a dedicated buffer at the target router, and a control circuit 2911 which performs a switch allocation (SA) function for conducting arbitration between buffers with the same destination and between buffers with mutually different destinations. Likewise, the target router also includes a dedicated buffer 2912 which classifies the packets according to their destinations.

Figure 5B:
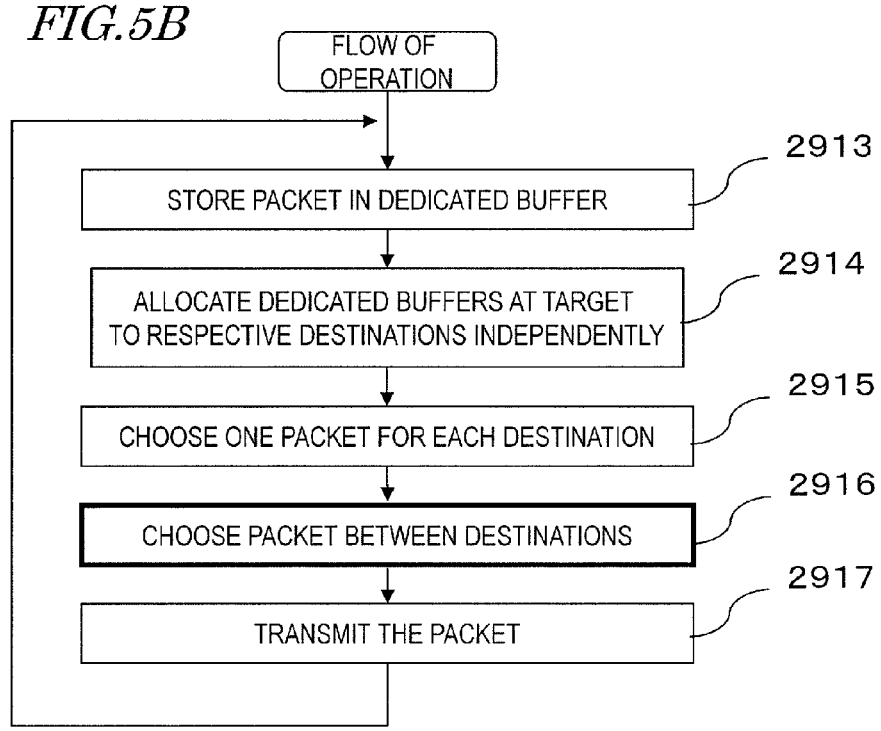
FIG. 5B shows the flow of operation of the router of the exemplary embodiment.

FIG. 5B shows the flow of operation of the router of this embodiment.

First of all, in Step 2913, the router classifies a packet received according to its destination and stores it in any of the dedicated buffers 2909.

Next, in Step 2914, the control circuit 2910 which performs the VC allocation (VA) function of the router chooses one of its own buffers 2909 which is permitted to use the buffer 2912 at the target router on a destination basis.

Subsequently, in Step 2915, the control circuit 2911 which performs the switch allocation (SA) function of the router chooses packets to transmit one by one from packets with the same destination.

Thereafter, in Step 2916, the control circuit 2911 of the router chooses a single packet to transmit from those packets with different destinations, each of which has been selected in Step 2915.

And in Step 2917, the arbitrator of the router transmits the packet thus chosen.

As can be seen, although arbitration between packets with multiple different destinations is conducted by using the VC allocation (VA) function according to the conventional technologies, the arbitration between such packets with different destinations gets done according to this embodiment by using the switch allocation (SA) function in order to handle the congestion more flexibly.

Consequently, according to this embodiment, such dedicated buffers need to be provided, thus requiring a larger chip area compared to the conventional technologies. However, since there is no need to expand the VC allocation (VA) function according to this embodiment, packets can be transmitted easily with a shorter time delay using a highly flexible configuration, which is a problem to be overcome by the present invention. Thus, by making the transmission loads uniform on a destination basis with such a configuration adopted, there will be no destinations with increased time delays, and therefore, the time delay caused by the overall system can be shortened.

FIG. 6 shows the definitions of required quality classes which are supposed to be used according to this embodiment.

Figure 7A:
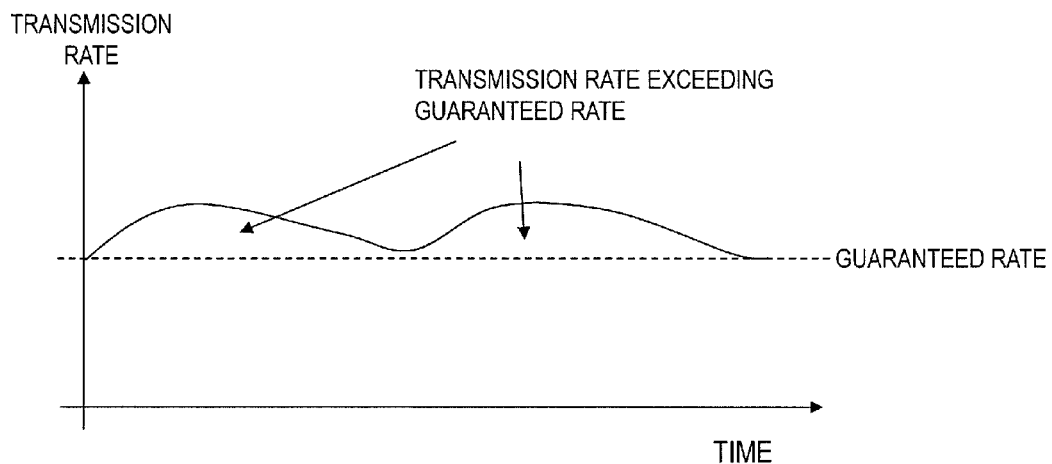
FIGS. 7A and 7B show how the transmission rate changes with time in the processor class and in the rate-guaranteed class, respectively.
Figure 7B:
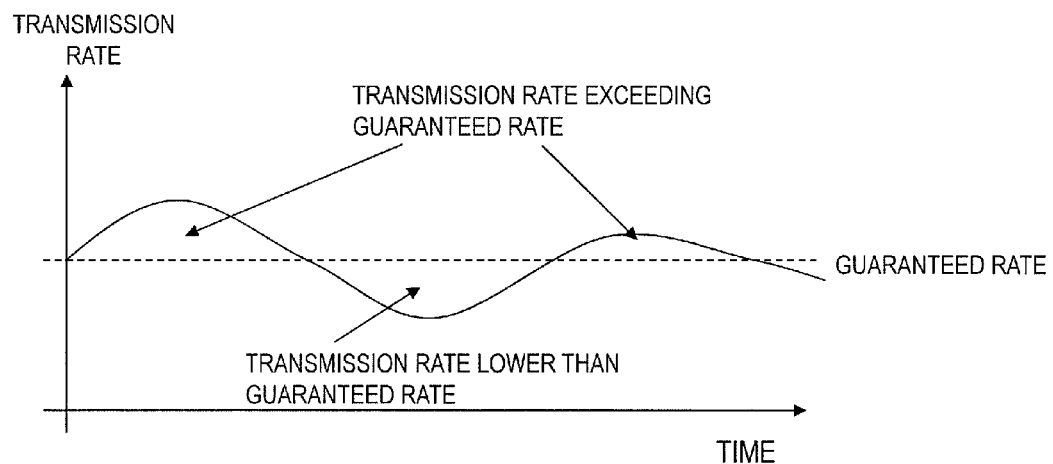

On the other hand, FIGS. 7A and 7B show how the transmission rate changes with time in the processor class and in the rate-guaranteed class, respectively.

The present inventors set four kinds of required quality classes, namely, a delay-guaranteed class, a processor class, a rate-guaranteed class, and a best-effort class. Each bus master is supposed to be grouped into any of these four classes.

It should be noted that this classification is only an example and no way limiting. Thus, the router may also be configured under a condition that each bus master is grouped into two or more arbitrary classes.

A bus master which issues a traffic flow that needs to be transmitted within a permitted time delay while communicating with a shared memory is grouped into the delay-guaranteed class. For example, a bus master which performs video or audio processing is grouped into this delay-guaranteed class.

A bus master which issues a traffic flow that needs to have its transmission rate guaranteed to be at least as high as a predetermined rate while communicating with a shared memory is grouped into the processor class. A traffic flow featuring an access request of the processor class may be transmitted at a rate exceeding the predetermined rate (as shown in FIG. 7A, for example). Or the access request of a traffic flow, of which the required rate cannot be defined, may also be grouped into the processor class. Furthermore, a bus master, of which the total size of the access requests (data) varies due to an irregular variation in the frequency of occurrence of the access requests, may be grouped into this processor class, too. For example, a CPU (central processing unit) which carries out an OS (operating system) falls into this processor class. Likewise, a CPU which executes a browser application also falls into this processor class.

A bus master which issues a traffic flow that needs to have its transmission rate that varies with time guaranteed on average while communicating with the shared memory is grouped into the rate-guaranteed class (see FIG. 7B). As shown in FIG. 7B, look how the transmission rate varies with time according to this class, and it can be seen that sometimes a traffic flow, of which the transmission rate is higher than the transmission rate to be guaranteed, is generated, and sometimes a traffic flow, of which the transmission rate is lower than the transmission rate to be guaranteed, is generated, too. For example, a master which performs filter processing in retouching image data, for instance, falls into this rate-guaranteed class. A master which processes an audio signal also falls into this rate-guaranteed class.

A bus master which issues a traffic flow that does not have to have its transmission performance ensured while communicating with the shared memory is grouped into the best-effort class. For instance, a GPU (graphics processing unit) which generates a synthetic CG (computer graphics) image falls into this best-effort class. Meanwhile, in an application in which high response to a GPU is required, the GPU may also be regarded as falling into the processor class.

According to this embodiment, the priority levels of these classes are supposed to decrease in the order of (1) delay-guaranteed class, (2) processor class, (3) rate-guaranteed class, and (4) best-effort class.

Hereinafter, a specific embodiment will be described just as an example of the present invention.

Figure 8:
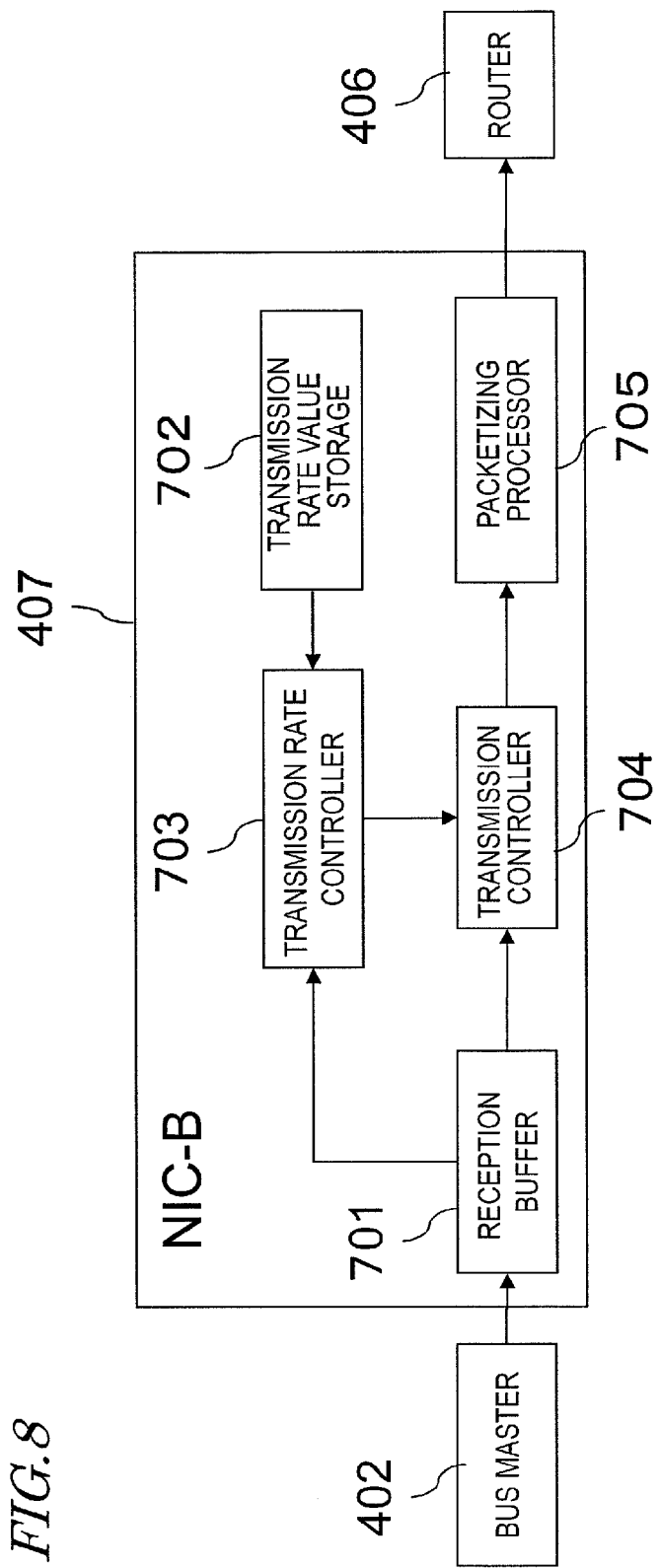
FIG. 8 illustrates a configuration for an NIC-B 407.

FIG. 8 illustrates a configuration for an NIC-B 407.

This NIC-B 407 has the function of packetizing the data that has been received from the bus master 402 into packets and transmitting the packets to the router 406 and the function of controlling the transmission rate so that the transmission rate of the access requests (data) received from the bus master 402 does not exceed a predetermined rate.

According to this embodiment, in order to transmit the access requests (data) from each bus master to the access controller at a rate exceeding the guaranteed rate, the transmission rate of the NIC-B 407 is set to be a value higher than the guaranteed rate. Alternatively, the access requests (data) received from each bus master may be transmitted as they are without imposing any upper limit to the transmission rate.

The NIC-B 407 includes a reception buffer 701, a transmission rate value storage 702, a transmission rate controller 703, a transmission controller 704, and a packetizing processor 705.

The reception buffer 701 is a memory which stores the data that has been received from the bus master 402.

The transmission rate value storage 702 is a memory which stores the upper limit value of the transmission rate. The transmission rate value is determined in advance on a bus master basis.

The transmission rate controller 703 controls the transmission interval of the access requests (data) that are stored in the reception buffer 701 based on the transmission rate value that is stored in the transmission rate value storage 702.

The transmission controller 704 transmits the access requests (data) that are stored in the reception buffer 701 at the transmission interval specified by the transmission rate controller 703.

The packetizing processor 705 transforms the access requests (data) into packets and sends the packets to the router.

Figure 9:
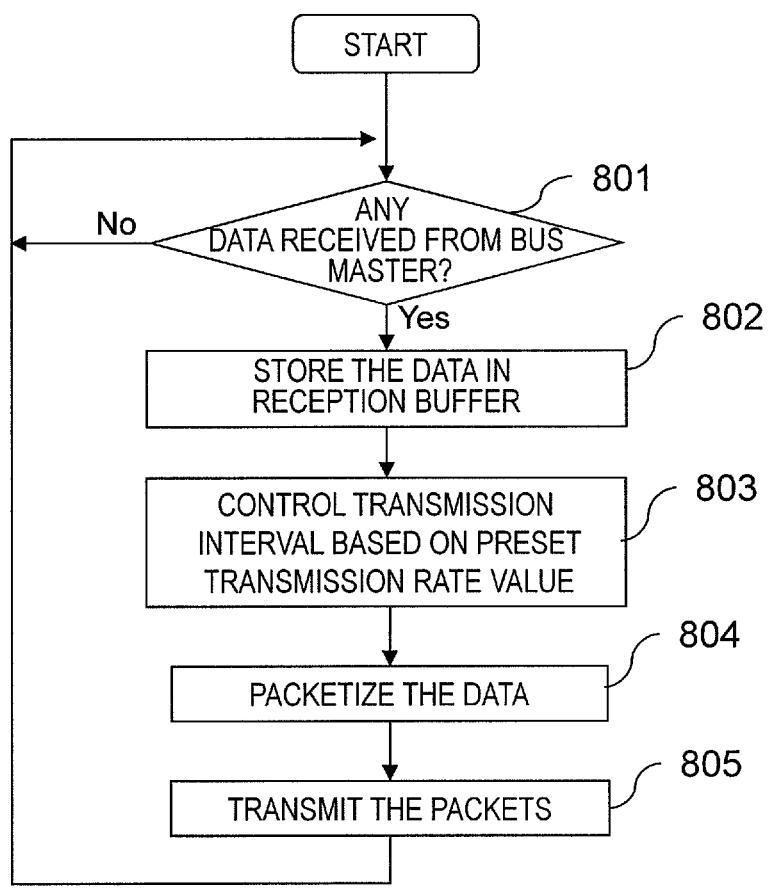
FIG. 9 shows the flow of operation of the NIC-B 407 (see FIG. 8) that sets the transmission rate of the bus master.

FIG. 9 shows the flow of operation of the NIC-B 407 (see FIG. 8) that sets the transmission rate of the bus master.

First of all, in Step 801, the reception buffer 701 of the NIC-B 407 determines whether or not any data transmission request has been received from the bus master 402. If the answer is YES, the process advances to Step 802. Otherwise, this processing step 801 is performed all over again.

Next, in Step 802, the reception buffer 701 of the NIC-B 407 stores the data that has been received from the bus master 402.

Then, in Step 803, the transmission rate controller 703 controls the transmission interval of the access requests (data) so that the data can be transmitted at the transmission rate value that is stored in the transmission rate value storage 702 and transmits the access requests (data) that are stored in the reception buffer 701.

Subsequently, in Step 804, the packetizing processor 705 packetizes the access requests (data).

And in Step S805, the packetizing processor 705 sends the packets and the process goes back to the processing step 801.

By performing this series of processing steps 801 to 805 over and over again, the NIC-B 407 transmits the access requests (data) from the bus master at a preset transmission rate.

In the NIC-B 407 of this embodiment which is connected to bus masters belonging to the processor and rate-guaranteed classes in which packets may be transmitted at a rate exceeding the guaranteed rate, the transmission rate value is set to be higher than the guaranteed one. However, the transmission rate value may also be set to be as high as the guaranteed rate or any other arbitrary value.

Figure 10:
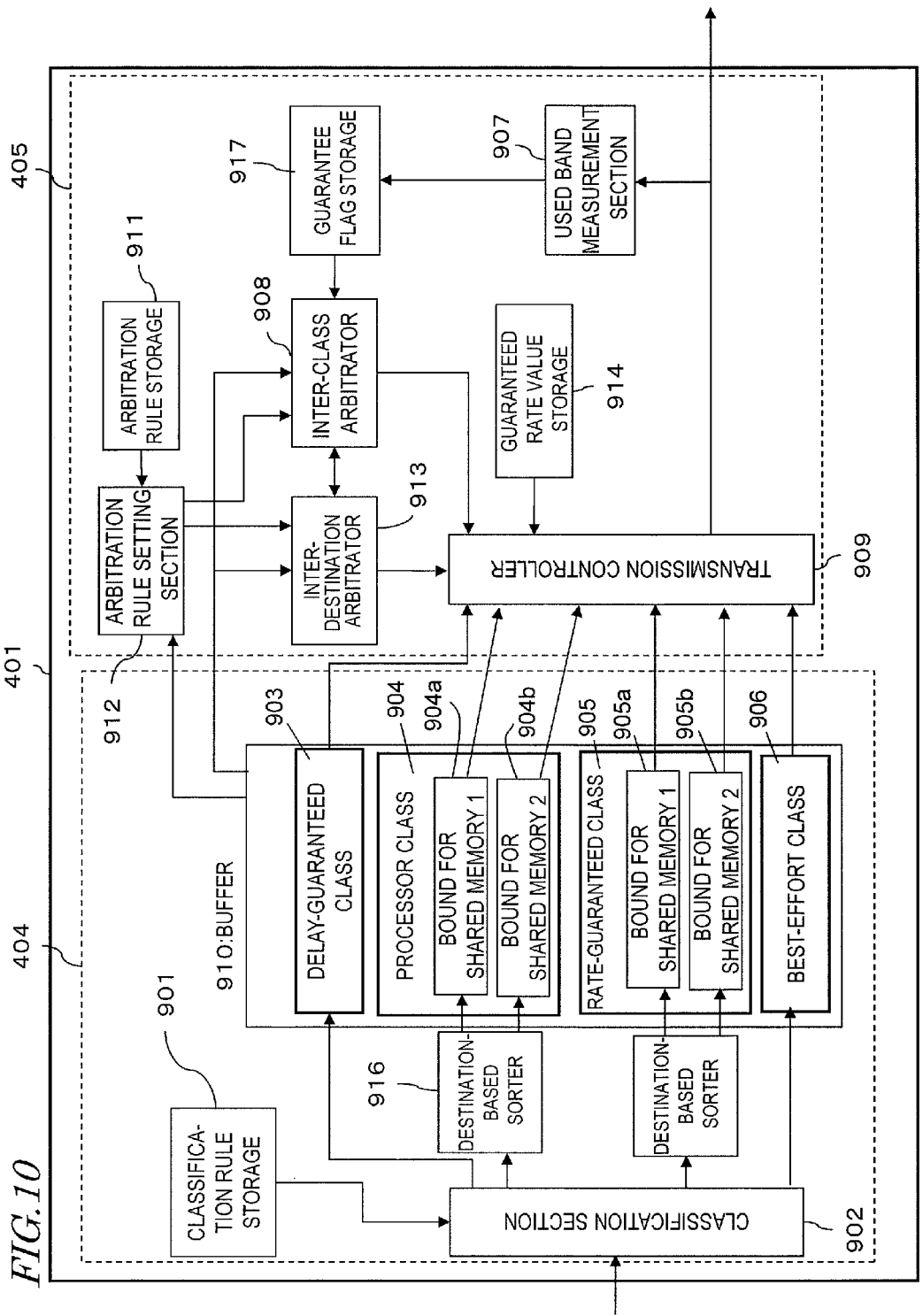
FIG. 10 illustrates an exemplary configuration for the access controller 401.

FIG. 10 illustrates an exemplary configuration for the access controller 401.

In the following description, the associated controller 401 is supposed to operate to process access requests that have come from only the processor-class and rate-guaranteed-class bus masters for the sake of simplicity. Actually, however, the access controller 401 can operate in response to access requests coming from bus masters belonging to any of the classes that have already been described with reference to FIG. 6.

In the example to be described below, the access controller 401 of this embodiment is supposed to be implemented to form part of the router 406 in which access requests coming from a plurality of bus masters are aggregated together into a single transmission route. Actually, however, the router 406 also has a routing function to deliver the data to the destination and a VC allocation function to secure a buffer to store packets at the next relay point. However, the following description will be focused on the function to conduct arbitration between a plurality of access requests and description of the routing and VC allocation functions will be omitted herein.

The access controller 401 includes an access request management section 404 and an arbitrator 405. Hereinafter, respective functional blocks that form this access controller 401 will be described.

The access request management section 404 manages the access requests (data) coming from the bus masters by grouping those requests into a number of quality class and destination combinations. To process the four kinds of guaranteed classes separately, the access request management section 404 of this embodiment includes four different kinds of buffers (storage areas) 903 to 906 which are provided for the respective access request classes. Among those four kinds of buffers, the processor-class buffer 904 includes buffers 904a and 904b allocated to shared memories #1 and #2. Likewise, the rate-guaranteed-class buffer 905 also includes buffers 905a and 905b allocated to shared memories #1 and #2. The access request management section 404 further includes a classification rule storage 901, a classification section 902 and a destination-based sorter 916.

The classification rule storage 901 stores a classification rule which defines the relation between the transmission performance ensured classes that the respective bus masters 402 need to satisfy. The classification rule storage 901 may be a storage device such as a memory or a register.

The classification section 902 determines, based on the source of the access request (data) received and the classification rule defined by the classification rule storage 901, which guaranteed class the source bus master belongs to. The classification section 902 may be an integrated circuit which is implemented as a piece of hardware.

The destination-based sorter 916 sorts out the access requests (data) received according to their destinations. The destination-based sorter 916 may also be an integrated circuit which is implemented as a piece of hardware.

That is to say, the access request management section 404 may be implemented as a combination of the six kinds of buffers and a controller (integrated circuit) which manages input, storage and output of data into/from those buffers.

The buffer (storage area) 903 is used to store delay-guaranteed-class access requests (data). The buffers (storage areas) 904 (904a and 904b) are used to store processor-class access requests (data). The buffers (storage areas) 905 (905a and 905b) are used to store rate-guaranteed-class access requests (data). And the buffer (storage area) 906 is used to store best-effort-class access requests (data).

As long as the transmission routes to the shared memory 403 can be changed, any of various configurations may be adopted for the storage areas 903 to 906 which are provided for the access request management section 404. For example, the storage areas 903 to 906 may be provided as multiple physically separated buffers, as logically separated storage areas in a single buffer, or as a combination thereof.

In the following description, the buffers (storage areas) 903 to 906 are supposed to be provided as multiple physically separated buffers 903 to 906.

The arbitrator 405 allows one only of those access requests with mutually different required qualities access to the shared memory. The arbitrator 405 may also be an integrated circuit which is implemented as a piece of hardware.

The arbitrator 405 of this embodiment includes a used band measurement section 907, an inter-class arbitrator 908, a transmission controller 909, an arbitration rule storage 911, an arbitration rule setting section 912, an inter-destination arbitrator 913 and a guaranteed rate value storage 914.

A guarantee flag storage 917 records the transmission quantities of the access requests (data) that have been transmitted on a class-by-class basis and on a destination basis, and stores the value of a guarantee flag for use to determine whether access requests (data) for the guaranteed rate have been transmitted or not.

The used band measurement section 907 measures the transmission quantities of the access requests (data) that have been transmitted to the shared memory 403 on a class-by-class basis and records the transmission quantities measured in the guarantee flag storage 917. In addition, by referring to the accumulated value, the used band measurement section 907 determines whether or not data with a predetermined transmission quantity for the guaranteed rate has been transferred and records the result of the decision in the guarantee flag storage 917.

In accordance with the decision about whether or not class-by-class access requests are stored in the access request management section 404 and the decision made by the used band measurement section 907 about whether or not the accumulated value of the transmission quantities has reached a predetermined transmission quantity for the guaranteed rate, the inter-class arbitrator 908 conducts arbitration in the access requests to transmit between the classes. For example, the inter-class arbitrator may select the required qualities for the data to be transmitted in the order of the severity of the required qualities.

In accordance with the decision about whether or not class-by-class access requests are stored in the access request management section 404, the inter-destination arbitrator 913 conducts arbitration between the access requests. More specifically, if the access requests stored in the access request management section 404 include some access requests with mutually different destinations, the inter-destination arbitrator 913 conducts arbitration between those access requests. For example, the inter-destination arbitrator 913 selects destinations for the data to be transmitted either to make the transmission quantities of the access requests (data) to be transmitted to the respective destinations as uniform as possible or at random.

The arbitration rule storage 911 records an arbitration rule (including in what order the arbitration needs to be conducted and on what condition the respective rules should be applied) to determine which of the inter-class arbitrator 908 and the inter-destination arbitrator 913 should conduct its arbitration earlier than the other.

Following the rule recorded in the arbitration rule storage 911, the arbitration rule setting section 912 determines which of the inter-class arbitrator 908 and the inter-destination arbitrator 913 should be given preference over the other.

The guaranteed rate value storage 914 stores the guaranteed rate values for the respective classes.

The transmission controller 909 gets, from the guaranteed rate value storage 914, the guaranteed rate for the class that has been selected by the inter-class arbitrator 908, thereby setting the transmission quantity. In addition, the transmission controller 909 transmits the access requests (data) from the buffer of the access request management section 404 that has been selected by the inter-destination arbitrator 913 and the inter-class arbitrator 908.

Hereinafter, the overall flow of operation of the access controller 401 will be described.

Figure 11:
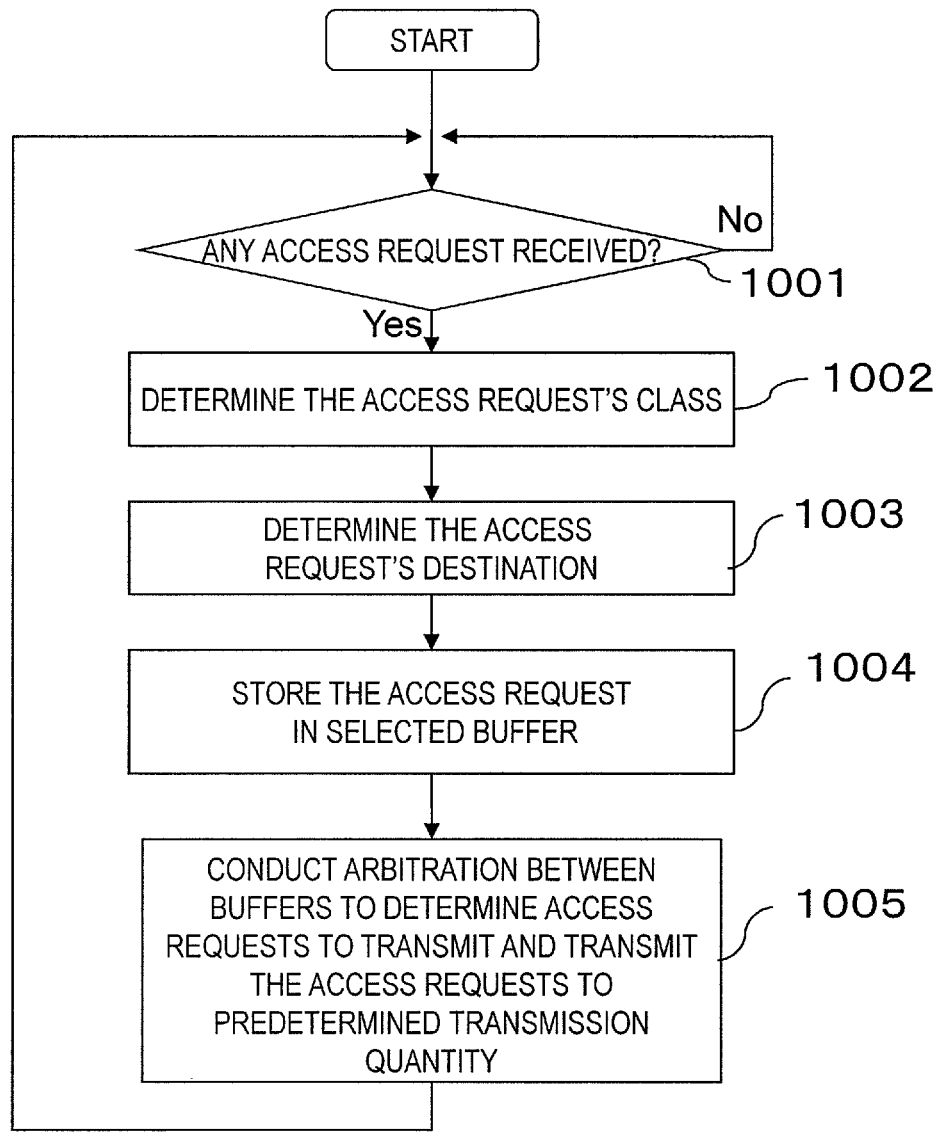
FIG. 11 shows the overall general flow of operation of the access controller 401.

FIG. 11 shows the overall general flow of operation of the access controller 401.

First, in Step 1001, the classification section 902 of the access controller 401 determines whether or not the NIC-M 408 has issued a request to access the shared memory 403. If the answer is YES, the process advances to Step 1002. Otherwise, this processing step 1001 is performed all over again.

Next, in Step 1002, the classification section 902 determines, in accordance with the classification rule recorded in the classification rule storage 901, the quality class of the bus master that is the source of the access request received.

Subsequently, in Step 1003, the destination-basis sorting section 916 determines the destination of the access request received.

Then, in Step 1004, the classification section 902 and the destination-basis sorting section 916 stores the access request (data) in the buffer associated with the quality class that has been determined in Step 1002 and with the destination that has been determined in Step 1003.

Thereafter, in Step 1005, the arbitrator 405 conducts arbitration between the access requests (data) that are stored in the buffers 903, 904 (904a and 904b), 905 (905a and 905b) and 906 in the access request management section 404 to choose a single access request (data) to be transmitted to the shared memory 403, and transmits the access request (data) thus chosen.

Next, the overall operation of the arbitrator 405 will be described with reference to FIG. 13. After that, it will be described with reference to FIGS. 15, 16, 17, and 18 specifically how used band measurement section 907, inter-class arbitrator 908, inter-destination arbitrator 913 and transmission controller 909 operate.

By performing this series of processing steps 1001 through 1005 over and over again, the access controller 401 conducts arbitration between the access requests (data) that have been received from a plurality of bus masters 402 and transmits a selected one of the access requests to the shared memory 403.

FIG. 12 shows an exemplary classification rule 1101, which is a rule that describes correspondence between a bus master's ID (identification information) and that bus master's quality class. The classification rule 1101 has been set in advance during the design process and stored in the classification rule storage 901.

According to the classification rule 1101 shown in FIG. 12, the quality class to which the bus masters with IDs (identification information) "00", "01" and "02" belong is the delay-guaranteed class, the bus master with an ID (identification information) "03" belongs to the processor class, the bus masters with IDs (identification information) "04" and "05" belong to the rate-guaranteed class, and the bus master with an ID (identification information) "06" belongs to the best-effort class. Such a rule has been set in advance.

Figure 13:
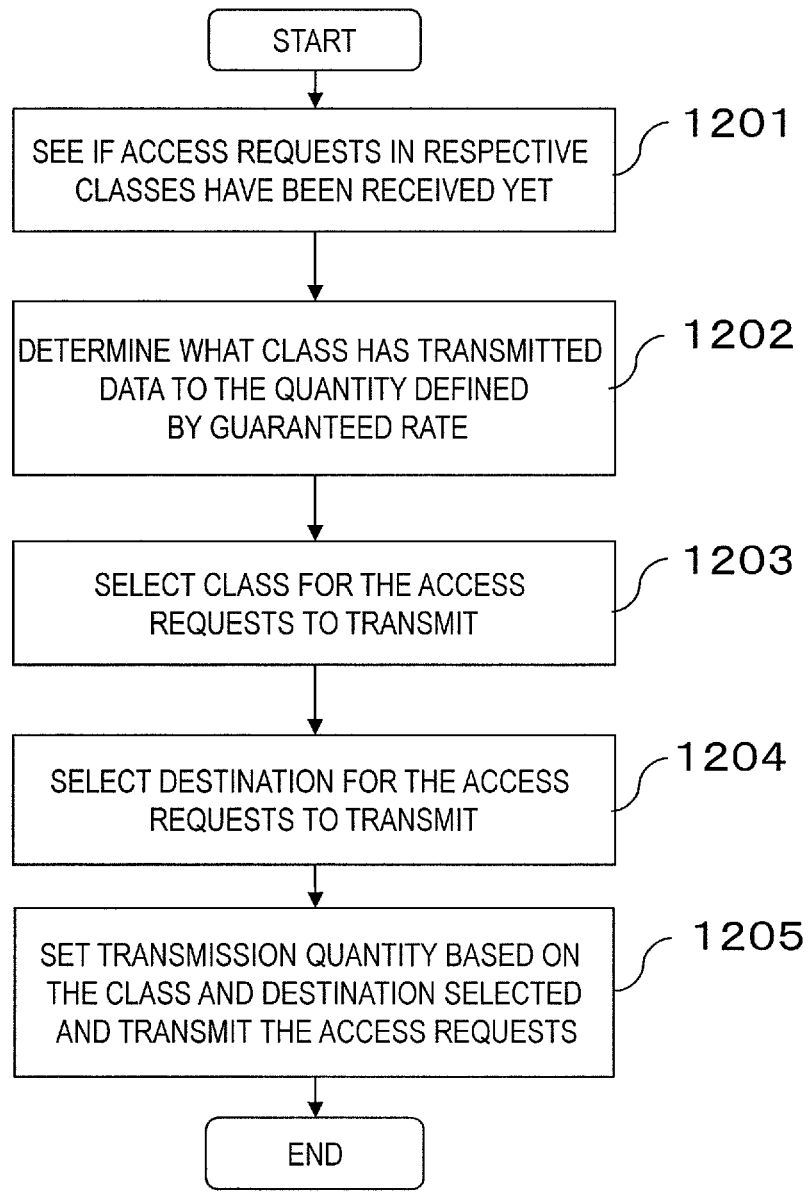
FIG. 13 shows the overall flow of operation of the arbitrator 405.

FIG. 13 shows the overall flow of operation of the arbitrator 405.

With respect to multiple access requests (data) that are stored in the access request management section 404, the arbitrator 405 adjusts the transmission schedule for the access requests (data) according to their classes and destinations.

First of all, in Step 1201, the inter-class arbitrator 908 sees if access requests (data) in respective classes have been received yet.

Next, in Step 1202, the inter-class arbitrator 908 refers to the guarantee flag storage 917 to determine what is the class of the bus master that has already transmitted access requests (data) to the transmission quantity defined by the guaranteed rate. The information stored in the guarantee flag storage 917 will be described later with reference to FIG. 14.

Then, in Step 1203, the inter-class arbitrator 908 selects a class for the access requests (data) to transmit. It will be described in further detail later with reference to FIG. 16 exactly how the inter-class arbitrator 908 operates.

Thereafter, in Step 1204, the inter-destination arbitrator 913 selects a destination for the access requests (data) to transmit. It will be described in further detail later with reference to FIG. 17 exactly how the inter-destination arbitrator 913 operates.

Subsequently, in Step 1205, the transmission controller 909 sets the transmission quantity value for the access requests for which the class and destination have been selected, and then transmits those access requests (data). It will be described in further detail later with reference to FIG. 19 exactly how the transmission controller 909 operates.

Figures 14, 15:
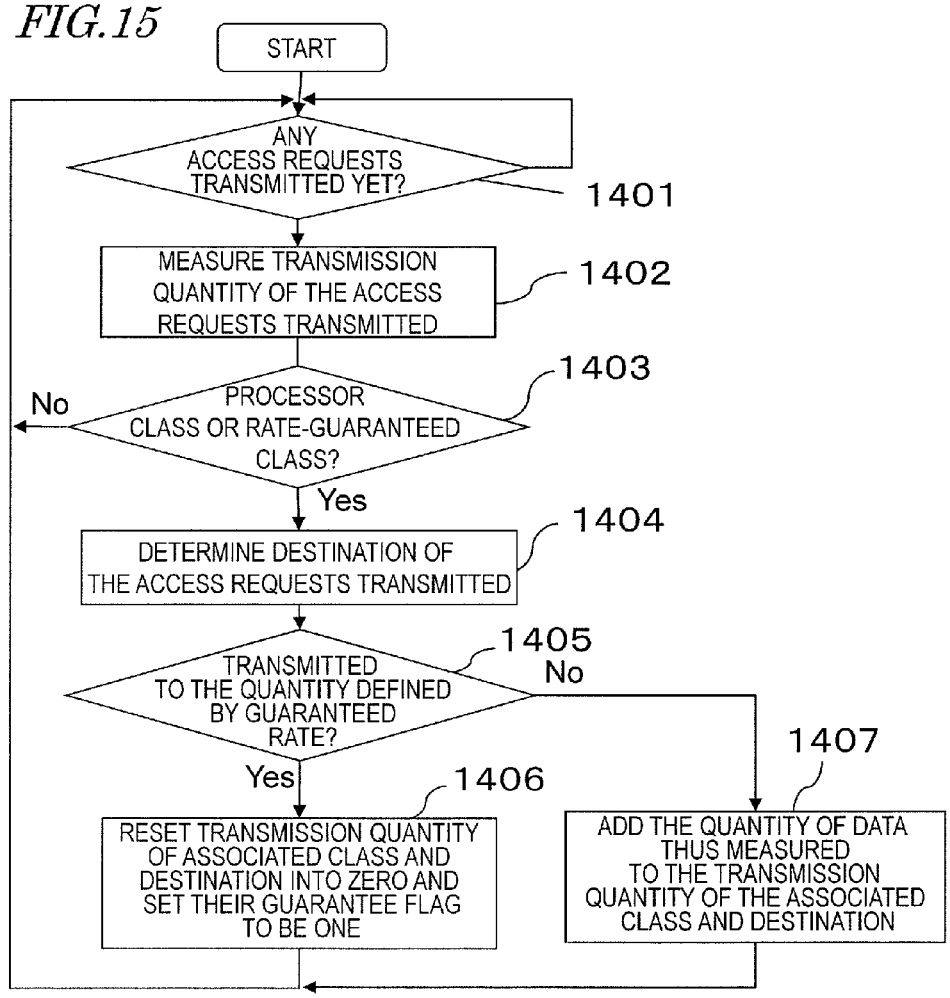
FIG. 14 shows the guarantee flag and transmission quantity values for the respective access requests (data) that are recorded in the guarantee flag storage 917.
FIG. 15 shows the flow of operation of the used band measurement section 907.

FIG. 14 shows the guarantee flag and transmission quantity values for the respective access requests (data) that are recorded in the guarantee flag storage 917. In this embodiment, the guarantee flags and transmission quantities are provided for the respective access requests (data) with respect to Memories #1 and #2 in the processor class and Memories #1 and #2 in the rate-guaranteed class.

If an access request (data) has not been transmitted yet at the guaranteed rate, the value of the guarantee flag is set to be zero. On the other hand, if an access request (data) has already been transmitted at the guaranteed rate, the value of the guarantee flag is set to be one.

If the guarantee flag is zero, the accumulated value of the access requests (data) that have been transmitted so far is recorded as the transmission quantity value. However, when the guarantee flag changes into one, the transmission quantity value is reset into zero.

FIG. 15 shows the flow of operation of the used band measurement section 907.

The used band measurement section 907 measures the transmission quantities of the respective access requests (data) in the processor class and rate-guaranteed class, to say the least. And the used band measurement section 907 determines, with respect to respective class-destination combinations, whether or not each bus master has transmitted access requests (data) to a predetermined transmission quantity defined by the guaranteed rate, and makes management by changing the value of the guarantee flag that is stored in the guarantee flag storage 917.

In this embodiment, the guarantee flag value is set to be zero when the access controller is started. Also, even a guarantee flag, of which the value has changed into one, has its value reset into zero on a regular basis every time a predetermined amount of time, defined by the guaranteed rate, passes.

First of all, in Step 1401, the used band measurement section 907 determines whether or not any access requests (data) have been transmitted yet. If the used band measurement section 907 has sensed that any access requests (data) have already been transmitted, the process advances to Step

1402. On the other hand, if the used band measurement section 907 has sensed that no access requests (data) have been transmitted yet, then this processing step 1401 is performed all over again.

Next, in Step 1402, the used band measurement section 907 measures the transmission quantity of the access requests (data) that have been transmitted to the shared memory 403 and stores the transmission quantity in the guarantee flag storage 917.

Subsequently, in Step 1403, the used band measurement section 907 determines what the class of the access requests (data) that have been transmitted is. If the class has turned out to be either the processor class or the rate-guaranteed class, the process advances to Step 1404. Otherwise, the process goes back to the processing step 1401.

Then, in Step 1404, the used band measurement section 907 determines the destination of the access requests (data) that have been transmitted.

Thereafter, in Step 1405, the used band measurement section 907 determines whether or not the access requests (data), of which the class and destination have been determined in this manner, have been transmitted to a predetermined transmission quantity defined by the guaranteed rate.

If the answer is YES, the process advances to Step 1406. Otherwise, the process advances to Step 1407.

In Step 1406, the used band measurement section 907 sets the guarantee flag of the associated class and destination to be one in the guarantee flag storage 917 and resets the transmission quantity into zero. And then the process goes back to the processing step 1401.

On the other hand, in Step 1407, the used band measurement section 907 adds the transmission quantity value of the access requests (data) thus measured to the transmission quantity of the associated class and destination in the guarantee flag storage 917. And then the process goes back to the processing step 1401.

By performing this series of processing steps 1401 through 1407 over and over again, the used band measurement section 907 determines, with respect to the access requests (data) in the processor and rate-guaranteed classes, whether or not each bus master has transmitted access requests (data) to a predetermined transmission quantity defined by the guaranteed rate, and makes management by changing the value of the guarantee flag that is stored in the guarantee flag storage 917.

Next, it will be described how the inter-class arbitrator 908 operates.

The inter-class arbitrator 908 selects a class for the access requests (data) to transmit depending on whether or not the access requests (data) are stored on a class-by-class basis in the access request management section 404 and based on the value of the guarantee flag.

Figure 16:
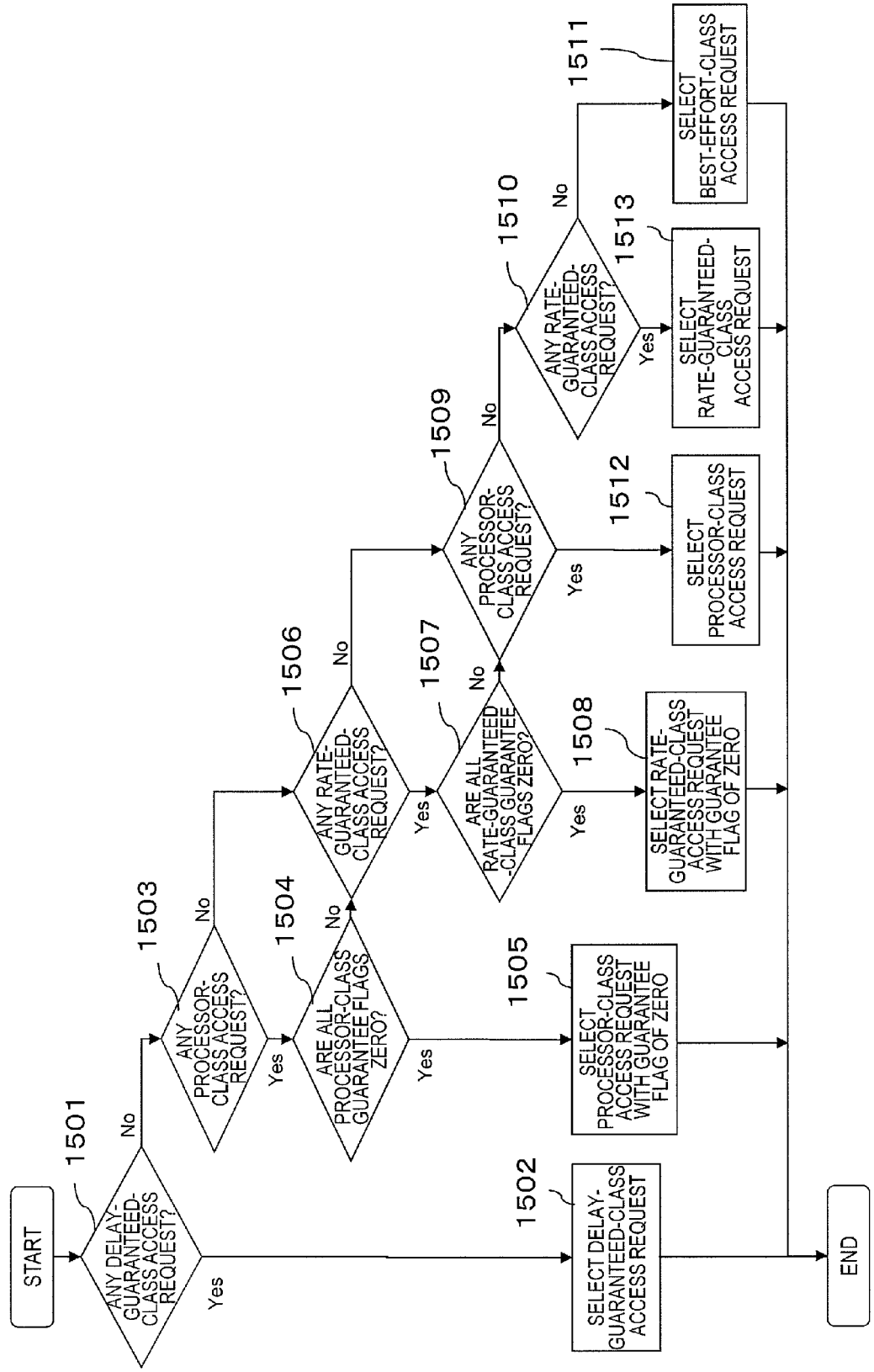
FIG. 16 shows the flow of operation of the inter-class arbitrator 908.

FIG. 16 shows the flow of operation of the inter-class arbitrator 908.

First of all, in Step 1501, the inter-class arbitrator 908 determines, by reference to the delay-guaranteed-class buffer 903 of the access request management section 404, whether or not any access requests (data) are stored there. If the answer is YES, the process advances to Step 1502. Otherwise, the process advances to Step 1503.

In Step 1502, the inter-class arbitrator 908 selects the delay-guaranteed class in the access request management section 404 to end its operation.

On the other hand, in Step 1503, the inter-class arbitrator 908 determines, by reference to the processor-class buffers 904 (904a and 904b) of the access request management section 404, whether or not any access requests (data) are stored there. If the answer is YES, the process advances to Step 1504. Otherwise, the process advances to Step 1506.

In Step 1504, the inter-class arbitrator 908 determines, by reference to the processor-class guarantee flag in the guarantee flag storage 917, whether or not there is any processor-class guarantee flag, of which the value is zero. If the answer is YES, the process advances to Step 1505. Otherwise, the process advances to Step 1506.

In Step 1505, the inter-class arbitrator 908 selects the processor-class access requests (data), of which the guarantee flag is zero, in the access request management section 404 to end its operation.

On the other hand, in Step 1506, the inter-class arbitrator 908 determines, by reference to the rate-guaranteed-class buffers 904 (904a and 904b) of the access request management section 404, whether or not any access requests (data) are stored there. If the answer is YES, the process advances to Step 1507. Otherwise, the process advances to Step 1509.

In Step 1507, the inter-class arbitrator 908 determines, by reference to the rate-guaranteed-class guarantee flag in the guarantee flag storage 917, whether or not there is any rate-guaranteed-class guarantee flag, of which the value is zero. If the answer is YES, the process advances to Step 1508. Otherwise, the process advances to Step 1509.

In Step 1508, the inter-class arbitrator. 908 selects the rate-guaranteed-class access requests (data), of which the guarantee flag is zero, in the access request management section 404 to end its operation.

On the other hand, in Step 1509, the inter-class arbitrator 908 determines, by reference to the processor-class buffers 904 of the access request management section 404, whether or not any access requests (data) are stored there. If the answer is YES, the process advances to Step 1512. Otherwise, the process advances to Step 1510.

In Step 1510, the inter-class arbitrator 908 determines, by reference to the rate-guaranteed-class buffers 905 of the access request management section 404, whether or not any access requests (data) are stored there. If the answer is YES, the process advances to Step 1508. Otherwise, the process advances to Step 1511.

In Step 1511, the inter-class arbitrator 908 selects the best-effort-class access requests (data) in the access request management section 404 to end its operation.

In Step 1512, the inter-class arbitrator 908 selects the processor-class access requests (data) in the access request management section 404 to end its operation.

In Step 1513, the inter-class arbitrator 908 selects the rate-guaranteed-class access requests (data) in the access request management section 404 to end its operation.

As can be seen, by performing this series of processing steps 1501 through 1513, the inter-class arbitrator 908 distinguishes the access requests (data) to be transmitted at the guaranteed rate from the access requests (data) to be transmitted at a rate exceeding the guaranteed one. After that, the inter-class arbitrator 908 sequentially selects one of those access requests (data) to be transmitted at the guaranteed rate after another in the descending order of their class priority levels. In addition, if there is any unused transmission band available, the inter-class arbitrator 908 sequentially selects one of those access requests (data) to be transmitted earlier at a rate exceeding the guaranteed rate after another in the descending order of their class priority levels.

Next, it will be described how the inter-destination arbitrator 913 operates.

The inter-destination arbitrator 913 determines, depending on whether or not access requests (data) are stored on a destination basis in the access request management section 404, the class for the access requests (data) to be transmitted.

Figures 17, 18:
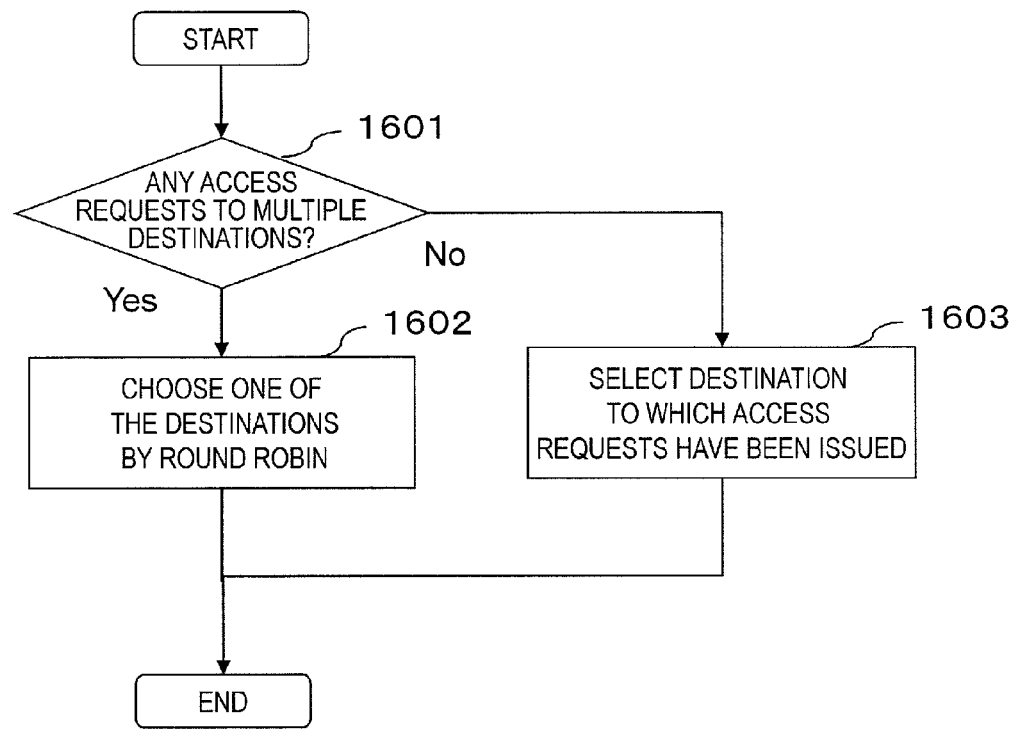
FIG. 17 shows the flow of operation of the inter-destination arbitrator 913.
FIG. 18 shows exemplary guaranteed rate values to be set for the delay-guaranteed class, processor class and rate-guaranteed class and to be stored in the guaranteed rate value storage 914.

FIG. 17 shows the flow of operation of the inter-destination arbitrator 913.

First of all, in Step 1601, the inter-destination arbitrator 913 determines, by reference to the buffers of the class that has been selected by the inter-class arbitrator 908, whether or not any access requests (data) to multiple destinations are stored in the access request management section 404. If the answer is YES, the process advances to Step 1602. Otherwise, the process advances to Step 1603.

In Step 1602, the inter-destination arbitrator 913 selects one of the multiple destinations, to which the access requests have been issued, by the round robin method to end its operation.

On the other hand, in Step 1603, the inter-destination arbitrator 913 selects a destination to which access requests have been issued to end its operation.

In Step 1602, the destination does not have to be selected by the round robin method but may also be selected by any of various other methods. For example, the destination may be selected at random. Or the transmission quantity may be counted for a certain period of time and when the count reaches a predetermined value, the destinations may be changed. These alternative methods can be said to be exemplary means for making the transmission loads as uniform as possible between the destinations. That is to say, any other method may also be adopted as long as the method contributes to making the transmission loads as uniform as possible between the destinations. In this description, such an operation of making the transmission loads as uniform as possible between the destinations will be sometimes referred to herein as a "distributing" operation. That is to say, in this description, if the inter-destination arbitrator 913 distributes the transmission quantities of the data among the respective destinations by selecting destinations for the data to be transmitted, it means that the inter-destination arbitrator 913 controls the transmission quantities of the data to the respective destinations so as to make the transmission loads as uniform as possible between the destinations by selecting appropriate destinations for the data to be transmitted.

It should be noted that the transmission loads should be made to be as uniform as possible in order to avoid an unwanted situation where overconcentration of transmission loads to only a few destinations causes transmission of other access requests to wait to increase the time delay significantly. That is why as long as it is possible to prevent the transmission loads from being overconcentrated to only a few destinations, the transmission loads do not have to be exactly uniform between the destinations. For example, in a situation where the access controller is going to transmit data to Destinations #1 and #2, unless overconcentration of transmission loads to one of the two destinations causes transmission of data to the other destination to wait, there may be some bias in the transmission quantity of the data between the two destinations. The inter-destination arbitrator 913 controls the transmission quantities of the data while permitting such a bias. And such a situation is also covered by the "distribution" of the data transmission quantities among respective destinations.

As can be seen, by performing this series of processing steps 1601 to 1603, the inter-destination arbitrator 913 selects destinations to make the transmission loads as uniform as possible between the destinations.

According to this embodiment, the inter-destination arbitrator 913 selects destinations for the class that has been selected by the inter-class arbitrator 908. As a result, it is possible to prevent preference given to some classes that severely require high qualities and overconcentration of transmission loads to only a few destinations from causing transmission of the other access requests to wait and increasing the time delay significantly.

FIG. 18 shows exemplary guaranteed rate values to be set for the delay-guaranteed class, processor class and rate-guaranteed class and to be stored in the guaranteed rate value storage 914.

In the example shown in FIG. 18, guaranteed rate values of 30, 20 and 10 are set for the delay-guaranteed class, processor class and rate-guaranteed class, respectively. These guaranteed rate values are supposed to be defined on a class-by-class basis and set in advance.

Next, it will be described how the transmission controller 909 operates.

The transmission controller 909 has the predetermined transmission quantity defined by the guaranteed rate with respect to the class that has been selected by the inter-class arbitrator 908 and the access requests (data) to the destination that has been selected by the inter-destination arbitrator 913, and transmits the access requests (data).

Figure 19:
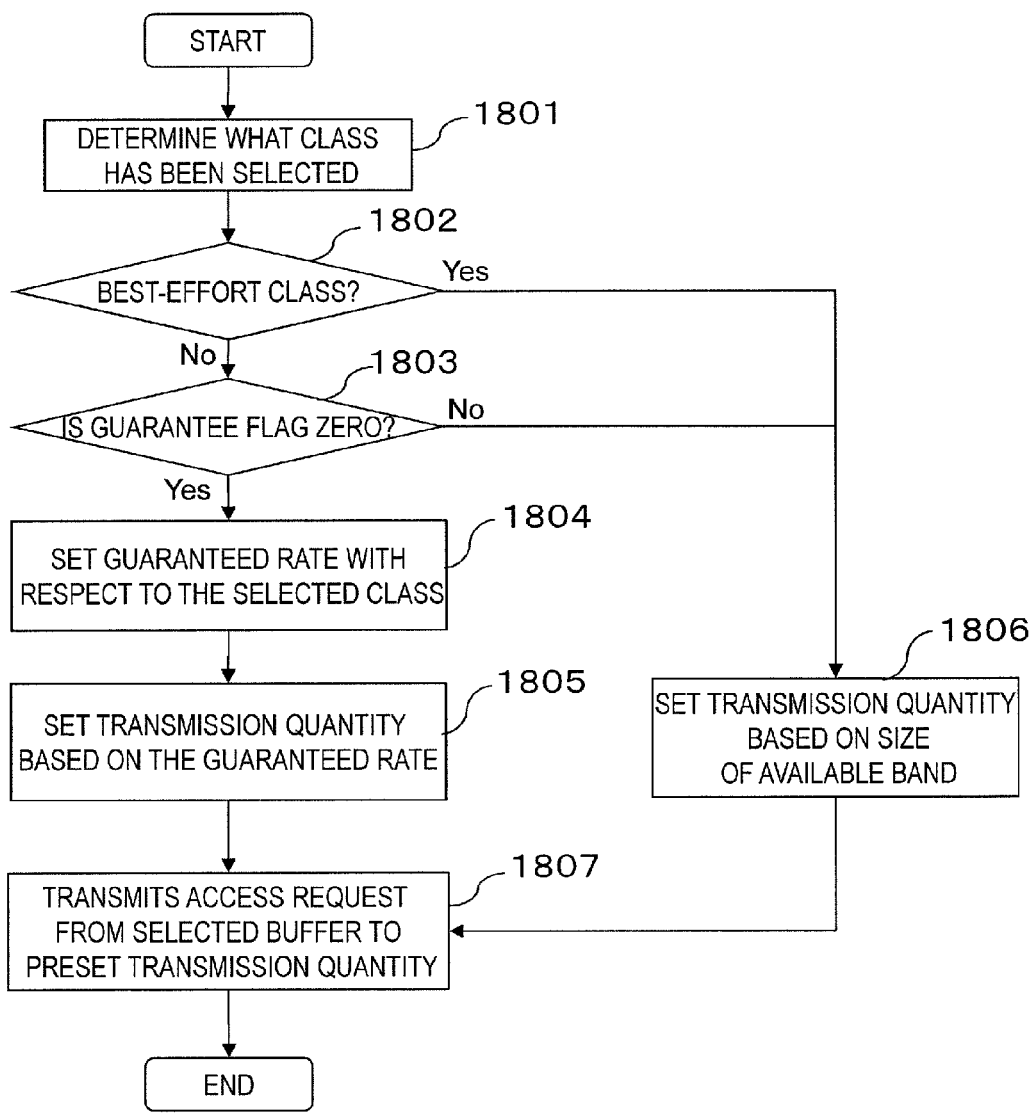
FIG. 19 shows the flow of operation of the transmission controller 909.

FIG. 19 shows the flow of operation of the transmission controller 909.

First of all, in Step 1801, the decision is made what class has been selected by the inter-class arbitrator 908 and what destination has been selected by the inter-destination arbitrator 913.

Next, in Step 1802, the decision is made whether the class that has been selected by the inter-class arbitrator 908 is the best-effort class or not. If the answer is YES, the process advances to Step 1806. Otherwise, the process advances to Step 1803.

Subsequently, in Step 1803, the values of the guarantee flags of the class and destination that have been selected by the inter-class arbitrator 908 and inter-destination arbitrator 913 are checked out. If the values of the guarantee flags turn out to be zero, the process advances to Step 1804. On the other hand, if the values of the guarantee flags turn out to be one, the process advances to Step 1806.

Since the access request selected has a guarantee flag value of zero, which indicates that the data has not yet been transmitted to the predetermined transmission quantity defined by the guaranteed rate, the transmission controller 909 refers in Step 1804 to the guaranteed rate value storage 914 and sets a guaranteed rate with respect to the class of the access request selected. After that, the process advances to Step 1805.

In Step 1805, the transmission controller 909 sets the transmission quantity for the access request based on the guaranteed rate that has been set. And the process advances to Step 1807.

Meanwhile, since the access request selected either belongs to the best-effort class or has a guarantee flag value of one, which indicates that the data of the access request has already been transmitted to the predetermined transmission quantity defined by the guaranteed rate, the transmission controller 909 sets in Step 1806 a transmission quantity for the access request (data) based on the size of the available band on the transmission route. After that, the process advances to Step 1807.

In Step 1807, the transmission controller 909 transmits the access request (data) in the selected class to the selected destination to the preset transmission quantity.

As can be seen, by performing this series of processing steps 1801 to 1807, the transmission quantity controller 909 transmits the access request (data) in the class selected by the inter-class arbitrator 908 to the destination selected by the inter-destination arbitrator 913 to the preset transmission quantity.

Figure 20:
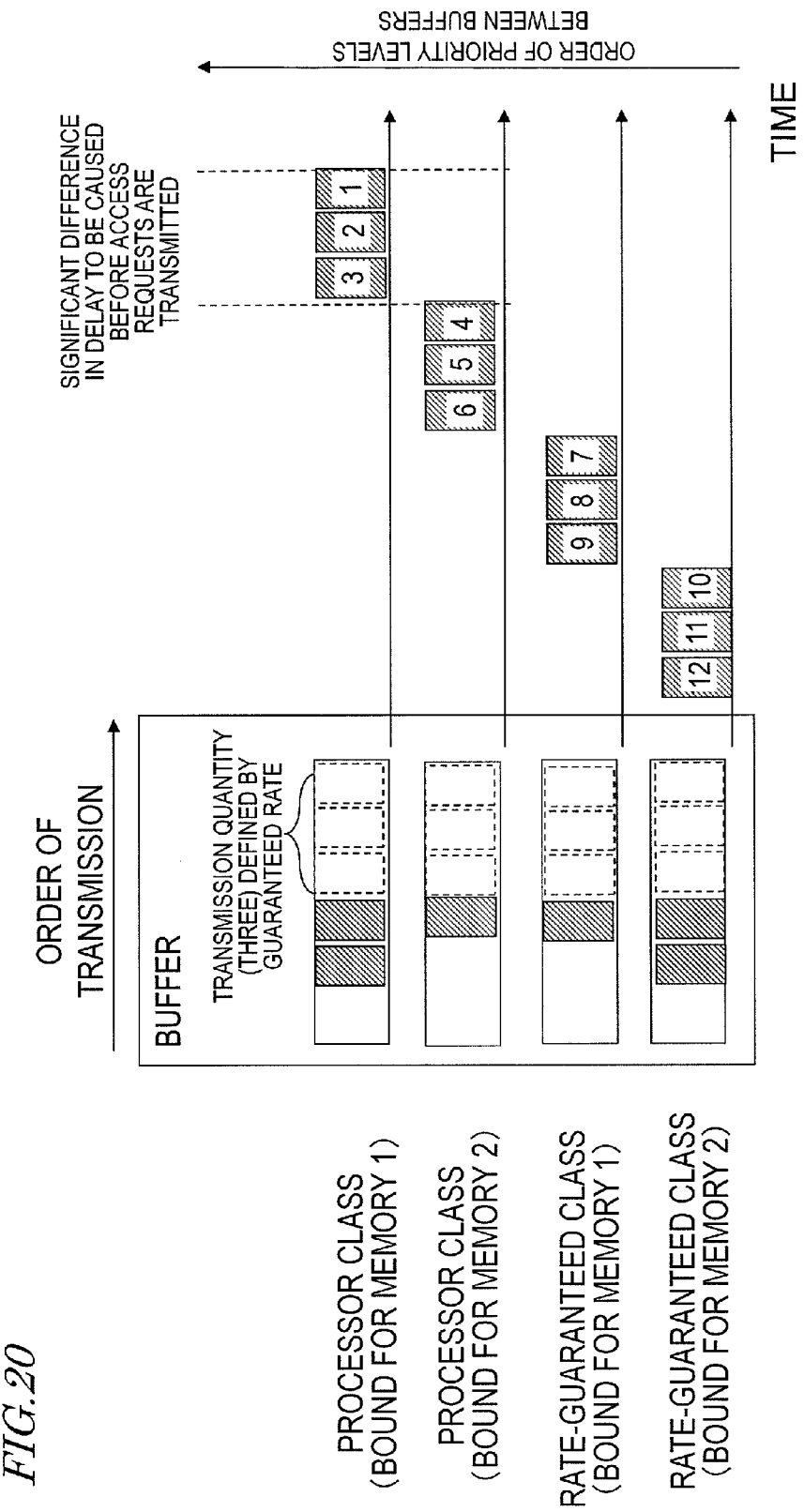
FIG. 20 shows in what order access requests (data) are transmitted from respective buffers in a situation where the access requests (data) are transmitted from the buffers to the transmission quantity as defined by the guaranteed rate.
Figure 21:
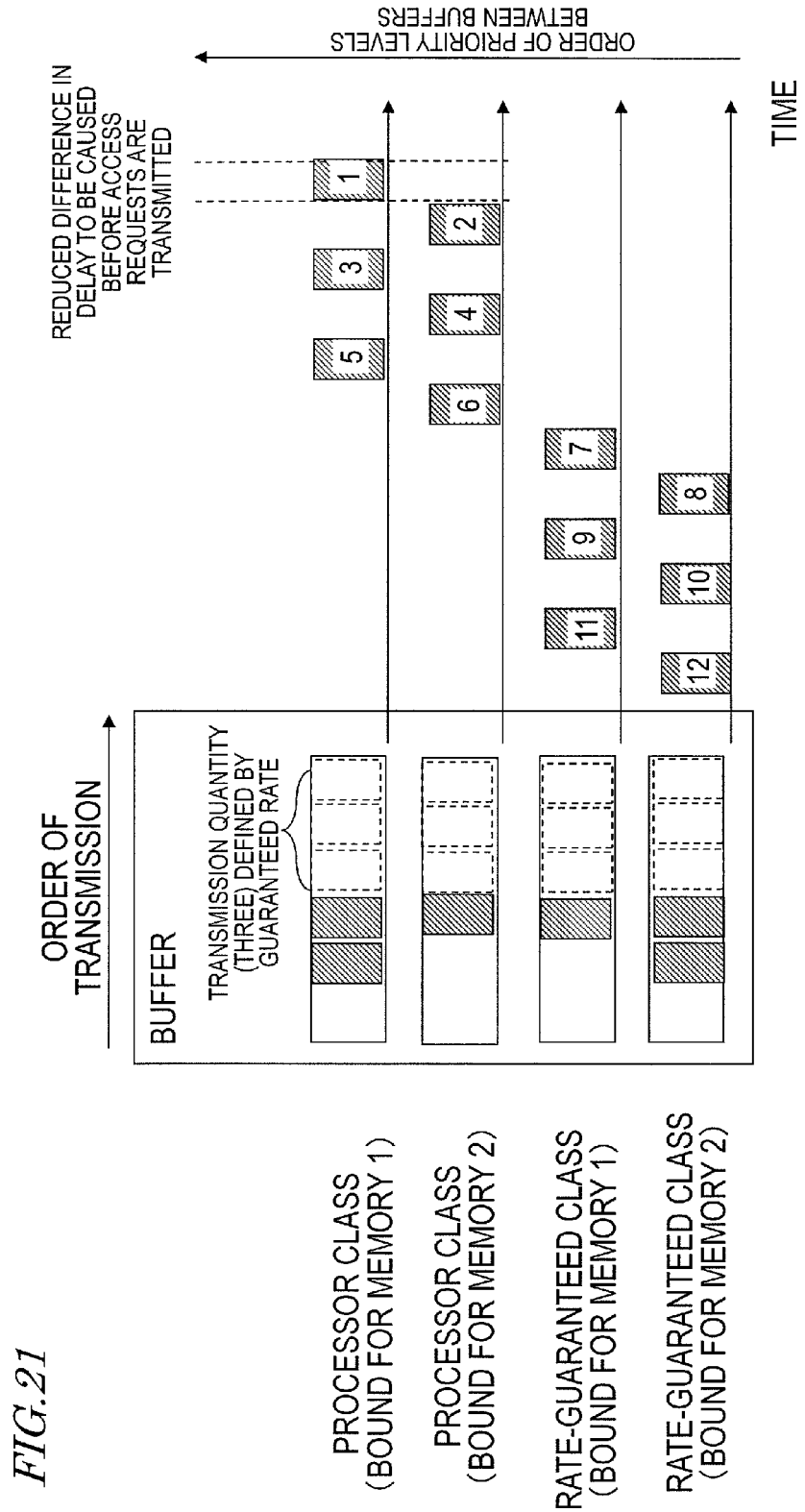
FIG. 21 shows in what order access requests (data) are transmitted from the respective buffers in a situation where those access requests (data) are transmitted to the transmission quantity defined by the guaranteed rate with arbitration conducted not only between the classes but also between the destinations so that access requests are transmitted from the buffer with the top priority level earlier than any other buffer.
Figure 22:
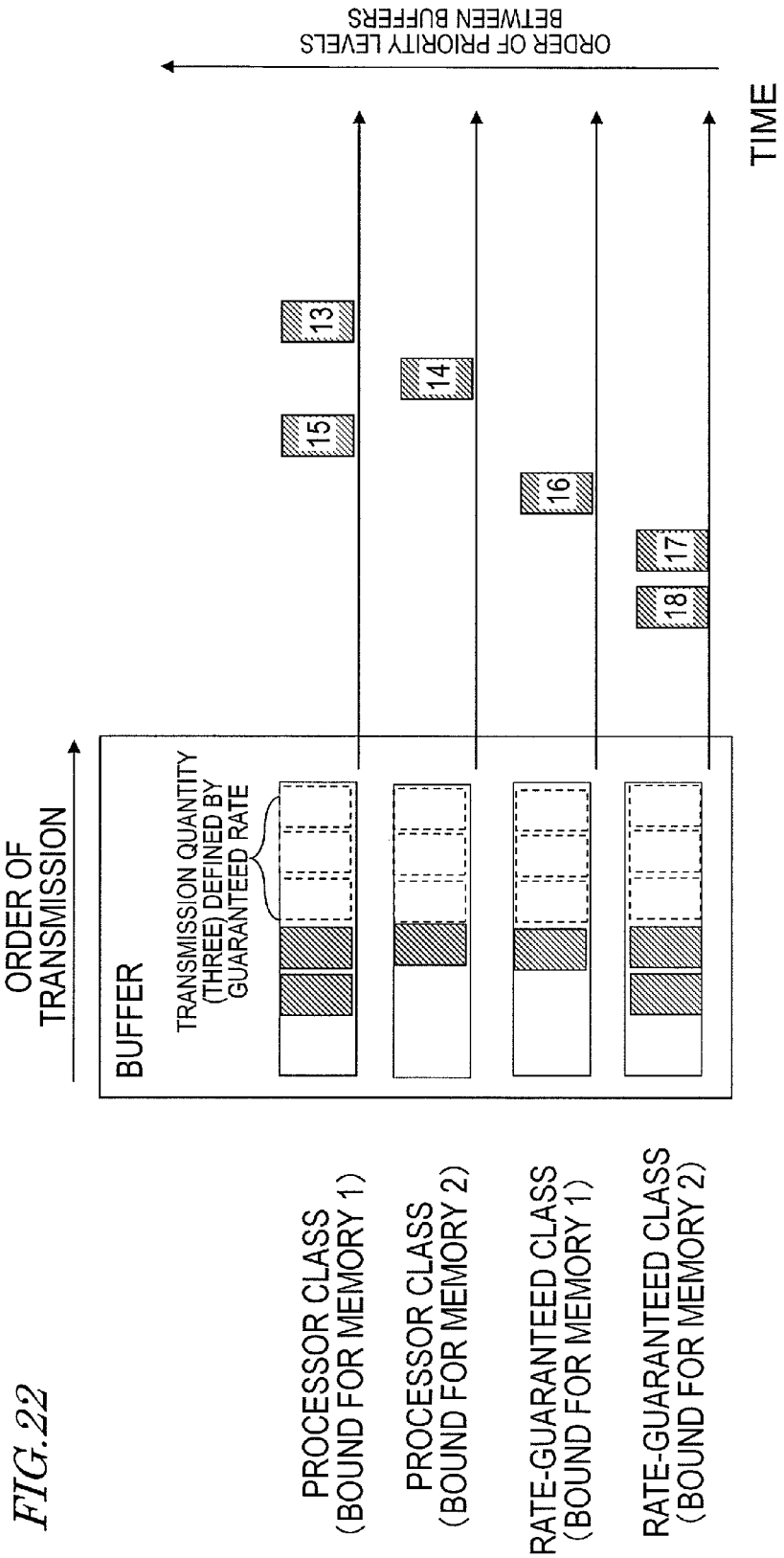
FIG. 22 shows in what order access requests (data) are transmitted from the respective buffers in a situation where those access requests (data) are transmitted at a rate exceeding the guaranteed rate with arbitration conducted between the destinations so that access requests are transmitted from the buffer with the top priority level earlier than any other buffer.

Hereinafter, it will be described with reference to FIGS. 20 to 22 how the access requests (data) stored in the access request management section 404 are transmitted to the shared memory 403 following the arbitrator's (405) flow of operation shown in FIG. 13. In FIGS. 20 to 22, the access requests (data) are supposed to be issued with respect to the processor class and the rate-guaranteed class for the sake of simplicity.

First of all, an example in which arbitration is conducted only between the classes and not conducted between the destinations will be described.

FIG. 20 shows in what order access requests (data) are transmitted from respective buffers in a situation where the access requests (data) are transmitted from the buffers to the transmission quantity as defined by the guaranteed rate.

FIG. 20 shows the order of transmission at a point in time when access requests (data) have been transmitted to the transmission quantity (three in this example) defined by the guaranteed rate in a state where five access requests (data) in the processor class that are bound for Memory #1, four access requests (data) in the processor class that are bound for Memory #2, four access requests (data) in the rate-guaranteed class that are bound for Memory #1, and five access requests (data) in the rate-guaranteed class that are bound for Memory #2 are stored.

It should be noted that the access requests (data) that are stored in each of these buffers are supposed to be transmitted sequentially from the right to the left so that the access request located at the rightmost position in the buffer is transmitted first, and the order of priority levels of the respective buffers is supposed to decrease from top to bottom so that the buffer at the top is given a top priority.

In this case, by transmitting the access requests in the rate-guaranteed class to the transmission quantity defined by the guaranteed rate after the access requests (data) in the processor class have all been transmitted to the transmission quantity defined by the guaranteed rate, the time delay to be caused by the processor class can be cut down with respect to the rate-guaranteed class. However, since no arbitration is conducted between Memories #1 and #2 that are their destinations, transmission of the access requests (data) to Memory #2 should wait until transmission of the access requests (data) to Memory #1 is completed.

In such a case, even though the two sets of access requests belong to the same processor class, the difference in time delay to be caused before the access requests are actually transmitted increases between those two sets that are bound for Memories #1 and #2.

On the other hand, FIG. 21 shows in what order access requests (data) are transmitted from the respective buffers in a situation where those access requests (data) are transmitted to the transmission quantity defined by the guaranteed rate with arbitration conducted not only between the classes but also between the destinations so that access requests are transmitted from the buffer with the top priority level earlier than any other buffer.

In this case, it is not until access requests (data) in the processor class have all been transmitted to the transmission quantity defined by the guaranteed rate that access requests (data) in the rate-guaranteed class are transmitted to the transmission quantity defined by the guaranteed rate. Since the data is transmitted so as to make the transmission quantities as uniform as possible between multiple different destinations after the time delay involved with the processor class has been cut down, the difference in the time delay to be caused before those access requests are transmitted can be reduced between Memories #1 and #2.

As a result, the increase in time delay can be checked with respect to a particular destination.

And FIG. 22 shows in what order access requests (data) are transmitted from the respective buffers in a situation where those access requests (data) are transmitted at a rate exceeding the guaranteed rate with arbitration conducted between the destinations so that access requests are transmitted from the buffer with the top priority level earlier than any other buffer.

Even when access requests (data) are transmitted at a rate exceeding the guaranteed rate, transmission of the access requests (data) in the processor class, if any, is given preference to transmission of access requests (data) in the rate-guaranteed class, and the order of transmission is determined so as to make the transmission quantities as uniform as possible between Memories #1 and #2 that are multiple destinations, just like when access requests (data) in the rate-guaranteed class are transmitted.

As can be seen from the foregoing description, this access controller 401 conducts arbitration between classes according to their required qualities in response to multiple access requests, and then conducts arbitration between destinations, thereby getting the arbitration done with high responsivity with respect to the processor class in which access requests need to be transmitted to multiple different destinations.

Hereinafter, it will be described how this access controller 401 can change the order of arbitration to be conducted between classes and between destinations. First of all, it will be described how the performance can be ensured by changing the order of arbitration to be conducted between classes according to the required quality and between the destinations.

If arbitration is conducted between the classes and then between the destinations, access requests (data) will be selected from the processor class that always has a high priority level, and therefore, the time delay caused by the processor class can be made shorter than the one caused by the rate-guaranteed class.

However, if an access request needs to be transmitted from a processor-class buffer to Memory #1 and another access request needs to be transmitted from a rate-guaranteed-class buffer to Memory #2, then transmission to Memory #1 is always given a higher priority, and therefore, transmission to Memory #2 should wait and Memory #2 will be used less efficiently.

On the other hand, if arbitration is conducted between the destinations and then between the classes, approximately the same number of access requests (data) will be delivered to each of Memories #1 and #2, and therefore, Memories #1 and #2 can be both used highly efficiently.

Suppose a processor-class buffer is going to transmit an access request (data) to Memory #1 and a rate-guaranteed-class buffer is going to transmit an access request (data) to Memory #2. In that case, while the rate-guaranteed-class buffer is transmitting the access request, transmission of the processor-class buffer should wait. As a result, the transmission delay caused by the processor-class buffer increases.

As can be seen, different effects will be achieved in terms of the transmission delay and the memory use efficiency depending on whether the arbitration is conducted between the classes and then between the destination or in reverse order.

Specifically, if the arbitration is conducted between the classes earlier than between the destinations, the memories can be used more efficiently with the time delay cut down preferentially. On the other hand, if the arbitration is conducted between the destinations earlier than between the classes, the time delay can be cut down with the memory use efficiency increased preferentially.

It should be noted that if there can be any classes, of which the priority levels are at least as high as that of the processor class with a severe short-delay requirement (e.g., a short-delay class and the processor class), the access request management section 404 may change the arbitration rule dynamically. For example, the access request management section 404 may use an arbitration rule that contributes to cutting down the transmission delay. If there are only classes with a less severe short-delay requirement (such as rate-guaranteed class and best-effort class), an arbitration rule that contributes to increasing the memory use efficiency for both of the two classes may be used. In that case, an access request may be transmitted in advance from a buffer in a class with a less severe short-delay requirement. And when a traffic flow is generated in response to an access request from a buffer in a class with a severe short-delay requirement (such as the short-delay class and the processor class), the traffic flow in that class can be transmitted quickly.

The arbitration rule may be changed by setting a plurality of rules and application conditions in advance in the arbitration rule storage 911 and by changing the rule to be followed by the arbitration rule setting section 912 according to the type of the access request stored in the access request management section 404.

FIG. 23 shows the information to be stored in the arbitration rule storage 911.

In the arbitration rule storage 911, stored are two rules which define the orders in which the inter-class arbitration and the inter-destination arbitration are supposed to be conducted and rule selecting conditions.

According to Rule #1 defined, if there is any access request (data), of which the required quality is at least as high as that of the processor class, among multiple access requests, arbitration is supposed to be conducted between the classes first according to the level of the required quality, and then between the destinations according to the difference between their destinations. As a result, the memory use efficiency can be increased with the time delay cut down preferentially in response to an access request with a severely required quality.

On the other hand, according to Rule #2 defined, unless there is any access request (data), of which the required quality is at least as high as that of the processor class, among multiple access requests, arbitration is supposed to be conducted first between the destinations according to the difference between their destinations and then between the classes according to the level of the required quality. As a result, the time delay can be cut down in response to an access request with a severely required quality with the memory use efficiency increased preferentially.

As can be seen, Rule #1 is adopted for a class that requires to cut down the delay such as the delay-guaranteed class and the processor class, while Rule #2 is adopted for a class that requires to increase the throughput such as the rate-guaranteed class.

Figure 24:
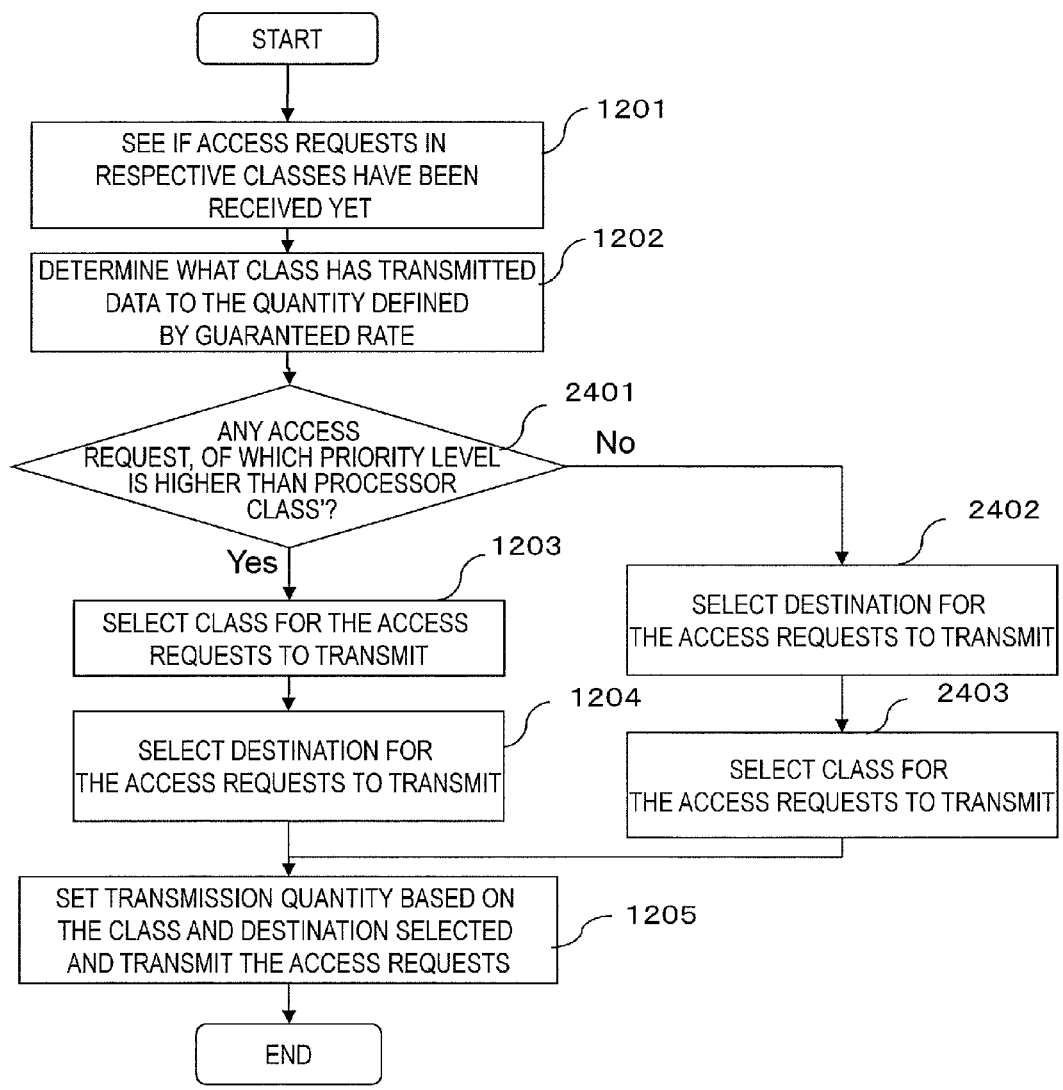
FIG. 24 shows how the arbitrator 405 operates when the arbitration rule needs to be changed dynamically.

FIG. 24 shows how the arbitrator 405 operates when the arbitration rule needs to be changed dynamically. In FIG. 24, the same processing step as the one shown in FIG. 13 is identified by the same reference numeral and description thereof will be omitted herein.

In Step 2401, the arbitration rule setting section 912 checks the types of access requests (data) that are stored in the access request management section 404 to see if there are any access requests (data), of which the priority level is higher than that of the processor class. If the answer is YES, the process advances to Step 1203. Otherwise, the process advances to Step 2402.

The processing step 2402 is the same as the processing step 1204 described above. When the processing step 2402 gets done, the process advances to Step 2403.

The processing step 2403 is the same as the processing step 1203 described above. When the processing step 2403 gets done, the process advances to Step 1105.

As can be seen from the foregoing description, since the arbitration rule is changed depending on whether or not there is any access request (data), of which the required quality is higher than that of the processor class, the time delay to be caused by an access request (data) in the processor class can be cut down short, and yet the use efficiency can be increased between the memories unless there are any processor-class access requests.

Next, it will be described how arbitration may be conducted by giving and taking the transmission quantity between the processor class and the rate-guaranteed class in order to increase the instant responsivity of the processor class.

According to the rate-guaranteed class, some traffic flows need to be transmitted at a higher rate than the transmission rate to be guaranteed, and other traffic flows need to be transmitted at a lower rate than the transmission rate to be guaranteed as shown in FIG. 7B. Anyway, the rate-guaranteed class has only to guarantee a predetermined transmission rate on average. That is why by transmitting in advance an access request that has been issued at a rate exceeding the guaranteed rate, the required performance can also be ensured even if the transmission quantity of the rate-guaranteed class is decreased after that.

On the other hand, according to the processor class, traffic flows generated need to be transmitted at higher transmission rates than the guaranteed rate as shown in FIG. 7A. Such traffic flows should be processed as soon as possible at higher transmission rates than the guaranteed one.

For that reason, by allocating the transmission quantity of the rate-guaranteed-class access requests (data) that were transmitted in advance while there were no processor-class access requests (data) (which will be referred to herein as "precedent access quantity") to the transmission quantity of processor-class access requests being generated, the transmission quantity of the processor class can be increased with the transmission performance of the rate-guaranteed class ensured. As a result, the instant responsivity of the processor class can be improved.

This access controller decreases the transmission quantity of the rate-guaranteed class and increases the transmission quantity of the processor class. Specifically, the access controller records the transmission quantity of the access requests (data) that have been transmitted in advance at a rate exceeding the guaranteed rate for the rate-guaranteed class. And when processor-class access requests (data) are generated after that, the access controller subtracts the transmission quantity of the access requests that have been transmitted in advance at the rate exceeding the guaranteed rate for the rate-guaranteed class from the transmission quantity of the rate-guaranteed class, and uses the remainder transmission quantity to transmit the processor-class access requests (data). This can be said that the transmission band is given and taken between those classes, so to speak.

Hereinafter, it will be described with reference to FIGS. 25 and 27, respectively, what configuration such an access controller may have to give and take the transmission quantity between the processor class and the rate-guaranteed class and in what procedure such an access controller may operate.

Figure 25:
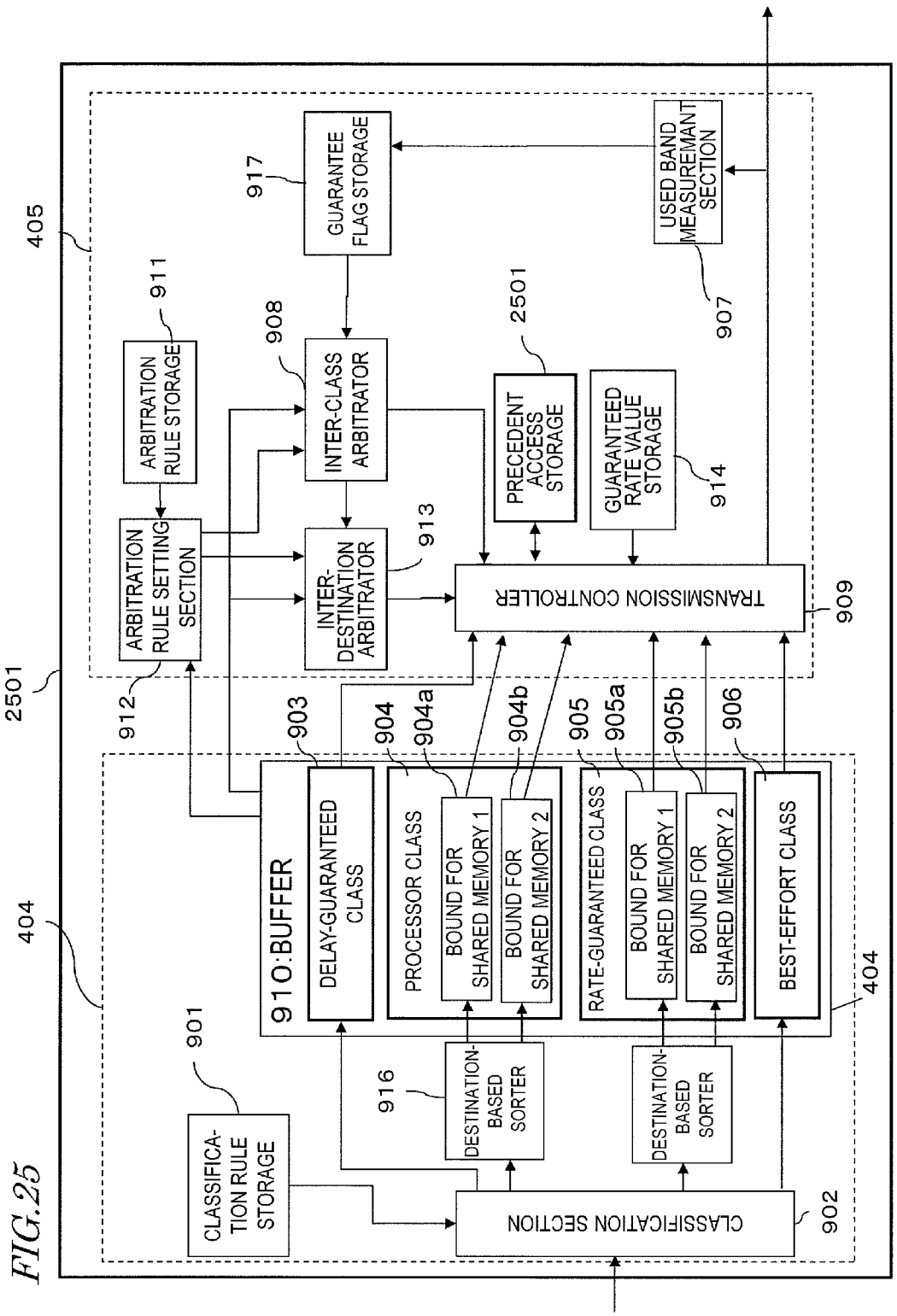
FIG. 25 illustrates an exemplary configuration for an access controller 2501 which gives and takes the transmission quantity between the processor class and the rate-guaranteed class.

FIG. 25 illustrates an exemplary configuration for an access controller 2501 which gives and takes the transmission quantity between the processor class and the rate-guaranteed class. In FIG. 25, any component also included in the access controller 401 shown in FIG. 10 and having substantially the same function as its counterpart is identified by the same reference numeral and description thereof will be omitted herein.

The precedent access storage 2501 records the number of the access requests (data) that have been transmitted in advance at a rate exceeding the guaranteed rate (which will be referred to herein as a "precedent access number").

In this embodiment, the precedent access number is recorded for the rate-guaranteed class.

Figure 26:
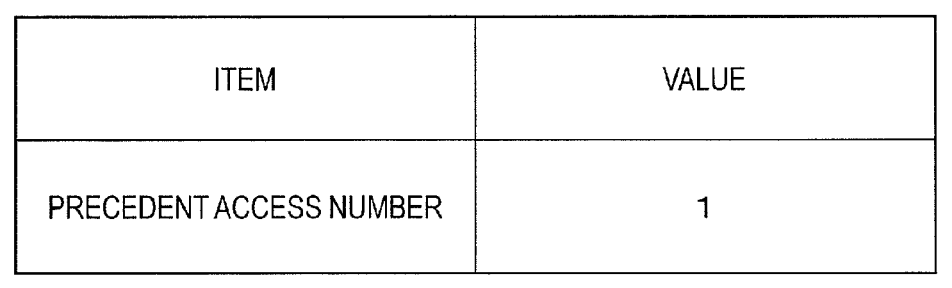

FIG. 26 shows the information to be stored in the precedent access storage 2501, which stores information about the value of the precedent access number as the transmission quantity of access requests (data) that have been transmitted in advance by the transmission controller 909.

In the example shown in FIG. 26, "1" is recorded as the value of the precedent access number for the rate-guaranteed class.

Figure 27:
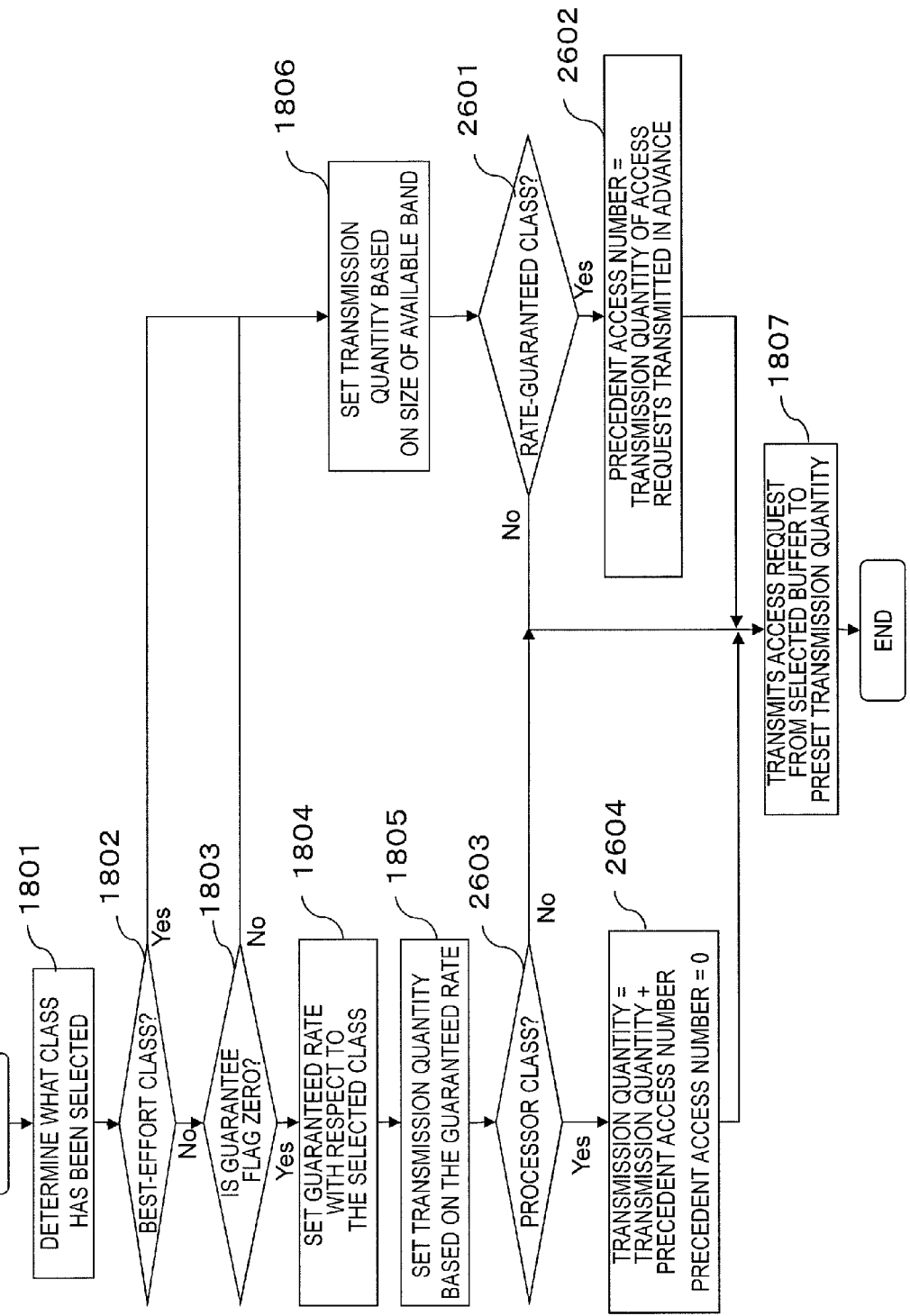
FIG. 27 shows the flow of operation of the transmission controller 909 which gives and takes the transmission quantity between the rate-guaranteed class and the processor class.

FIG. 27 shows the flow of operation of the transmission controller 909 which gives and takes the transmission quantity between the rate-guaranteed class and the processor class. In FIG. 27, the same processing step as the one shown in FIG. 19 is identified by the same reference numeral and description thereof will be omitted herein.

In Step 2601, the transmission controller 909 determines whether or not the access requests (data) belong to the rate-guaranteed class. If the answer is YES, the process advances to Step 2602. Otherwise, the process advances to Step 1807.

In Step 2602, the precedent access storage 2501 records the transmission quantity of the access requests (data) that have been transmitted in advance for the rate-guaranteed class as the precedent access number in the precedent access storage 2501. After that, the process advances to Step 1807.

Meanwhile, in Step 2603, the transmission controller 909 determines whether or not the access requests (data) transmitted belong to the processor class. If the answer is YES, the process advances to Step 2604. Otherwise, the process advances to Step 1807.

In Step 2604, the transmission controller 909 adds the transmission quantity corresponding to the precedent access number to the transmission quantity of the processor class, thereby increasing the transmission quantity of the processor class. In addition, the transmission controller 909 resets the value of the precedent access number into zero. After that, the process advances to Step 1807.

As can be seen, by performing this series of processing steps shown in FIG. 27, the transmission quantity of the access requests that have been transmitted in advance for the rate-guaranteed class is recorded as the precedent access number. And then by allocating the transmission quantity of the access requests that have been transmitted in advance to the transmission quantity of the access requests to be transmitted later for the processor class, the transmission quantity of the processor class can be increased.

FIGS. 28(A) through 28(D) illustrate how the time delay involved with the processor class can be cut down by allocating the transmission quantity of the access requests that have been transmitted in advance for the rate-guaranteed class to the transmission quantity of the access requests to be transmitted later for the processor class.

In the following description, it will be described just how the transmission quantity changes between the processor class and the rate-guaranteed class without describing how to conduct arbitration between the destinations for the sake of simplicity.

FIG. 28(A) illustrates how much space is left in the access request management section 404 at a point in time by which processor-class access requests and rate-guaranteed-class access requests have been received.

As shown in FIG. 28(A), three processor-class access requests (data) are stored and four rate-guaranteed-class access requests (data) are stored. Also, the transmission quantity as defined by the guaranteed rate is set to be three for both of the processor class and the rate-guaranteed class.

FIG. 28(B) shows how access requests (data) have been transmitted to the transmission quantity (three in this example) as defined by the guaranteed rate for the processor class and for the rate-guaranteed class in this order. As for the processor class, every access request has already been transmitted by transmitting as many access requests as the transmission quantity defined by the guaranteed rate. As for the rate-guaranteed class, on the other hand, one access request (data) is still yet to be transmitted even after as many access requests as the transmission quantity defined by the guaranteed rate have been transmitted.

FIG. 28(C) illustrates how an unused band is available on the transmission route and how the access controller 2501 has transmitted the only remaining access request (data) for the rate-guaranteed class in advance.

After having transmitted the rate-guaranteed-class access request (data) in advance, the transmission controller 909 writes the precedent access number on the precedent access storage 2501. In the precedent access storage 2501 shown in FIG. 26, "1" has been recorded as the precedent access number.

FIG. 28(D) illustrates how four access requests (data) have newly arrived for each of the processor and rate-guaranteed classes and as many access requests as the transmission quantity defined by the guaranteed rate have been transmitted out of those four access requests.

As for the processor class, the transmission controller 909 adds the transmission quantity corresponding to the precedent access number (i.e., one) to the transmission quantity as defined by the guaranteed rate (i.e., three), thus transmitting four access requests. As a result, the number of access requests (data) that have been transmitted successfully for the processor class (i.e., four) becomes larger by one than the number of access requests (data) transmitted for the rate-guaranteed class (i.e., three). As a result, the time delay can be cut down for the processor class.

Also, since the transmission quantity of the processor class has increased by one, the access requests (data) for the rate-guaranteed class will start to be transmitted with a delay. Even so, since the access request (data) has already been transmitted in advance, the required quality can also be ensured.

According to the method of the embodiment described above, the transmission quantity as defined by the guaranteed rate for the processor class is supposed to be increased by the precedent access number of the rate-guaranteed class. However, this is only an example. Alternatively, the transmission quantity for the rate-guaranteed class may also be decreased by the value of the precedent access number. Still alternatively, the transmission quantity may be increased for the processor class and decreased for the rate-guaranteed class at the same time.

In the embodiments described above, a configuration in which access requests (data) issued by all bus masters are aggregated into a single transmission route (see FIG. 3) has been described as just an example. However, this access controller is also applicable to any other configuration.

FIG. 29 illustrates an exemplary mesh-type topology which is used generally.

In this configuration, routers are arranged to form a grid and either a bus master or a memory is arranged for each of these routers. FIG. 29 illustrates a state where three bus masters have transmitted access requests toward mutually different memories.

Even in this mesh-type topology, if a plurality of memories are arranged, multiple access requests will be aggregated together at some router on the transmission routes leading from a plurality of bus masters to those memories. That is why by building the access controller in such a router where multiple access requests are aggregated together (or even in every router), the transmission performance can be ensured for each bus master and arbitration can be conducted with high responsivity and with the time delay reduced.

This access controller is applicable to not just such a mesh-type topology but also a torus-type, tree-type or any other topology as long as multiple access requests are aggregated together there.

In the embodiments described above, the access controller 401 or 2501 is supposed to be built in a router. However, the access controller 401 or 2501 may also be built in any other kind of device.

For example, in FIG. 3, the access controller 401 may be built in the NIC-M 408 where multiple access requests (data) are aggregated together. The NIC-M 408 de-packetizes the packets received from the router 406 into original data and includes a buffer for de-packetizing the packets. By storing the packets in the buffer so that the access requests (data) are managed according to their classes and destinations and by performing a transmission control with the function of the arbitrator 405 of this example implemented on the NIC-M 408, requests from any number of bus masters can be accepted flexibly enough, and transmission performance can be ensured for each bus master and arbitration can be conducted with high responsivity and with the time delay cut down.

Alternatively, in FIG. 3, the access controller 401 may be built in the memory controller 409. The memory controller 409 includes a buffer which stores the access requests (data) that have been received from the NIC-M 408. By storing the access requests (data) in this buffer so that the access requests (data) are managed separately according to their classes and destinations and by performing a transmission control with the function of the arbitrator 405 of this example implemented on the memory controller 409, requests from any number of bus masters can be accepted flexibly enough, and transmission performance can be ensured for each bus master and arbitration can be conducted with high responsivity and with the time delay cut down. Alternatively, when the access requests (data) are stored in the buffer, the access requests (data) may be managed separately according to their classes and their sources (which may be bus masters or NICs) and a transmission control may be performed with the function of the arbitrator 405 of this example implemented on the memory controller 409.

In the embodiments described above, the required qualities are supposed to be grouped into the four classes, namely, the delay-guaranteed class, the processor class, the rate-guaranteed class and the best-effort class. However, the number of the classes does not have to be four.

In some cases, a task which requires to guarantee the rate for a memory access request and a task which does not require to guarantee the rate may be both included in the processor class depending on the kind of processing to be performed. In that case, the processor class may be subdivided into a guaranteed processor class in which access requests are generated at irregular intervals and in which access requests of tasks that do require to guarantee the rate are managed and a non-guaranteed processor class in which access requests are generated at irregular intervals and in which access requests of tasks that do not require to guarantee the rate are managed. Just like the original processor class, the priority level of the guaranteed processor class may be set to be higher than that of the rate-guaranteed class. On the other hand, the priority level of the non-guaranteed processor class may be set to be lower than that of the rate-guaranteed class.

In subdividing the processor class, it may be determined on a bus master basis whether the access requests should be managed in the guaranteed processor class or in the non-guaranteed processor class. Alternatively, if a single bus master transmits both tasks that do require to guarantee the rate and tasks that do not require to guarantee the rate, the class to manage the access requests may be determined on a task-by-task basis.

In the foregoing description, each component of the access controller is illustrated as a block with its own unique function. However, the operation of this access controller can also get done even by making a processor (computer) built in the access controller execute a program that defines the processing to be carried out by those functional blocks. The procedure of the processing of such a program is just as shown in the flowcharts of FIGS. 9, 11, 13, 15, 16, 17, 19, 24 and 27.

In the exemplary embodiments and exemplary applications described above, configurations in which the present invention is implemented on a chip have been described. However, the present invention can be carried out not just as such on-chip implementation but also as a simulation program for performing design and verification processes before that on-chip implementation process. And such a simulation program is executed by a computer. In this exemplary application, the respective elements shown in FIG. 8 or 10 are implemented as a class of objects on the simulation program. By loading a predefined simulation scenario, each object class gets the operations of the respective elements performed by the computer. In other words, the operations of the respective elements are carried out either in series or in parallel to/with each other as respective processing steps by the computer.

An object class that is implemented as access controller gets such a simulation scenario which has been defined by a simulator loaded, thereby setting conditions on respective required quality definitions and so on.

The object class that is implemented as access controller performs its operation until the condition to end the simulation, which is described in the simulation scenario, is satisfied, thereby calculating and getting the throughput and latency during the operation, a variation in flow rate on the bus, and estimated operating frequency and power dissipation and providing them to the user of the program. And based on these data provided, the user of the program evaluates the performance of accesses from respective bus masters to a shared memory and performs design and verification processes.

For example, various sorts of information such as the ID and required quality class of a source bus master, the ID of a shared memory as destination, the size of a packet to transmit, and the timing to transmit the packet are usually described on each row of the simulation scenario.

Optionally, by evaluating a plurality of simulation scenarios in a batch, it can be determined efficiently whether or not the intended performance is ensured by every possible scenario imagined. Furthermore, by comparing the performances with the topology of the bus or the number and arrangement of bus masters and shared memories changed, it can be determined what system configuration is best suited to the simulation scenario. In that case, the configuration of any of the embodiments described above can be used as design and verification tools for this embodiment. That is to say, the present disclosure can also be carried out as such design and verification tools.

As can be seen from the foregoing description, an access controller according to the present disclosure can cope highly flexibly with any change in the arrangement or number of bus masters. In addition, when arbitration needs to be conducted between a plurality of first nodes (such as bus masters) which require mutually different levels of qualities and which are attempting to access the same second node (such as a slave), data can be transmitted with a short time delay by instantly responding to access requests from those bus masters that require various levels of qualities (such as processors and graphics processors) at a rate that is equal to or higher than a guaranteed one.

On top of that, since data can be transmitted with a short time delay, the throughput from the first nodes that require mutually different levels of qualities to the second node can be increased and the bus' band can be used much more efficiently.

The present disclosure is applicable to a network bus controller, control method and control program which use a data transfer route control technology on an on-chip bus at an SoC for an integral device, a general-purpose processor, or a local bus on a DSP.

While the present invention has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the invention that fall within the true spirit and scope of the invention.

What is claimed is:

1. An access controller which conducts arbitration between a plurality of first nodes, each of which is attempting to transmit data to any of a plurality of second nodes as destinations through a network of buses on a semiconductor integrated circuit, the access controller comprising:
a buffer which has storage areas, the buffer receiving the data that have been provided by the plurality of first nodes with mutually different required qualities and destinations, classifying the data according to their destinations and required qualities, and storing the classified data separately in the storage areas, each of the destinations being specified by each of the plurality of first nodes;
an inter-class arbitrator circuit which sequentially selects one of the required qualities of the data after another in the order of their severity;
an inter-destination arbitrator circuit which selects the destinations of the data to be transmitted and gets the transmission quantities of the data distributed among the destinations; and
a transmission controller circuit which controls transmission of the data based on the required qualities selected by the inter-class arbitrator circuit and the destinations selected by the inter-destination arbitrator circuit,
wherein the data with the mutually different required qualities include a first set of data with a relatively low level of required quality and a second set of data with a relatively high level of required quality,
the access controller further includes:
a used band measurement section which measures the transmission quantity of the first set of data; and
a precedent access storage which stores the transmission quantity of the first set of data that has been transmitted in advance at a rate exceeding the one guaranteed for the first set of data, and
the transmission controller which allocates the transmission quantity of the second set of data by reference to the transmission quantity that is stored in the precedent access storage.

2. The access controller of claim 1, wherein the inter-destination arbitrator circuit further selects the data to be transmitted so as to distribute the transmission quantities of the data with the required qualities that have been selected by the inter-class arbitrator circuit.

3. The access controller of claim 1, wherein with respect to the data, of which the destinations have been selected by the inter-destination arbitrator circuit, the inter-class arbitrator circuit sequentially selects one of the required qualities of the data after another in the order of their severity.

4. The access controller of claim 1, wherein the data with the mutually different required qualities include at least processor-class data and rate-guaranteed-class data.

5. The access controller of claim 4, wherein the required quality level of the processor class is set to be higher than that of the rate-guaranteed class.

6. The access controller of claim 4, wherein if there is any data, of which the required quality level is equal to or higher than that of the processor class, is in the buffer, the transmission controller transmits data, of which the required qualities have been selected by the inter-class arbitrator circuit and then of which the transmission quantities have been selected by the inter-destination arbitrator circuit so as to be as uniform as possible between plurality of destinations, but
if there is no data, of which the required quality level is equal to or higher than that of the processor class, is in the buffer, the transmission controller transmits data, which have had their destinations selected by the inter-destination arbitrator circuit and then have been selected by the inter-class arbitrator circuit in the order of severity of their required qualities.

7. The access controller of claim 1, wherein the inter-destination arbitrator circuit controls the transmission quantities of the data to the respective destinations so as to avoid causing transmission of the data to the respective destinations to wait.

8. The access controller of claim 7, wherein the inter-destination arbitrator circuit controls the transmission quantities of the data to the respective destinations with a bias in transmission quantity permitted between the data to the respective destinations.

9. The access controller of claim 1, further comprising at least one input port for receiving data from the plurality of first nodes, wherein the buffer comprises a plurality of dedicated buffers each corresponding to a destination for the data, and at least two dedicated buffers of the plurality of dedicated buffers are associated with the at least one input port, and wherein the buffer receives the data received by the at least one input port with mutually different required qualities and destinations, classifies the data according to their destinations and required qualities, and stores the classified data in one of the plurality of dedicated buffers that corresponds to the classified data and is associated with the at least one input port.

10. A router which conducts arbitration between a plurality of first nodes, each of which is attempting to transmit data to any of a plurality of second nodes as destinations through a network of buses on a semiconductor integrated circuit, the router comprising:
a buffer which has storage areas and receives the data that have been provided by the plurality of first nodes with mutually different required qualities and destinations, classifies the data according to their destinations and required qualities, and stores the classified data separately in the storage areas, each of the destinations being specified by each of the plurality of first nodes;
an inter-class arbitrator circuit which sequentially selects one of the required qualities of the data after another in the order of their severity;
an inter-destination arbitrator circuit which selects the destinations of the data to be transmitted and gets the transmission quantities of the data distributed among the destinations; and
a transmission controller which controls transmission of the data based on the required qualities selected by the inter-class arbitrator circuit and the destinations selected by the inter-destination arbitrator circuit,
wherein the data with the mutually difference required qualities include a first set of data with a relatively low level of required quality and a second set of data with a relatively high level of required quality,
an access controller comprising:
a used band measurement section which measures the transmission quantity of the first set of data; and
a precedent access storage which stores the transmission quantity of the first set of data that has been transmitted in advance at a rate exceeding the one guaranteed for the first set of data, and
the transmission controller which allocates the transmission quantity to the second set of data by reference to the transmission quantity that is stored in the precedent access storage.

11. A method for controlling an access controller which conducts arbitration between a plurality of first nodes, each of which is attempting to transmit data to any of a plurality of second nodes as destinations through a network of buses on a semiconductor integrated circuit, the method comprising:
receiving the data that have been provided by the plurality of first nodes with mutually different required qualities and destinations;
classifying the data according to their destinations and required qualities and separately storing the classified data in a buffer having a storage area, each of the destinations being specified by each of the plurality of first nodes;
sequentially selecting one of the required qualities of the data after another in the order of their severity;
selecting the destinations of the data to be transmitted and getting the transmission quantities of the data distributed among the destinations; and
controlling transmission of the data based on the required qualities selected in the step of selecting the required qualities and the destinations selected in the step of selecting the destinations,
wherein the data with the mutually different required qualities include a first set of data with a relatively low level of required quality and a second set of data with a relatively high level of required quality,
measuring the transmission quantity of the first set of data; and
storing the transmission quantity of the first set of data that has been transmitted in advance at a rate exceeding the one guaranteed for the first set of data, and
allocating the transmission quantity to the second set of data by reference to the transmission quantity that is stored.

12. A computer program, stored on a non-transitory computer-readable medium, for carrying out a simulation for an access controller which conducts arbitration between a plurality of first nodes, each of which is attempting to transmit data to any of a plurality of second nodes as destinations through a network of buses,
wherein the computer program is defined to make a computer carry out the access controlling method of claim 11.

13. An access controller which conducts arbitration between a plurality of first nodes, each of which is attempting to transmit data to any of a plurality of second nodes as destinations through a network of buses on a semiconductor integrated circuit, the access controller comprising:
a buffer which has storage areas, the buffer receiving the data that have been provided by the plurality of first nodes with mutually different required qualities and destinations, classifying the data according to their destinations and required qualities, and storing the classified data separately in the storage areas, each of the destinations being specified by each of the plurality of first nodes;
an inter-class arbitrator circuit which sequentially selects one of the required qualities of the data after another in the order of their severity;
an inter-destination arbitrator circuit which selects the destinations of the data to be transmitted and gets the transmission quantities of the data distributed among the destinations; and
a transmission controller circuit which controls transmission of the data based on the required qualities selected by the inter-class arbitrator circuit and the destinations selected by the inter-destination arbitrator circuit,
wherein the data with the mutually different required qualities include at least processor-class data and rate-guaranteed-class data,
wherein if there is any data, of which the required quality level is equal to or higher than that of the processor class, is in the buffer, the transmission controller transmits data, of which the required qualities have been selected by the inter-class arbitrator circuit and then of which the transmission quantities have been selected by the inter-destination arbitrator circuit so as to be as uniform as possible between plurality of destinations, but
if there is no data, of which the required quality level is equal to or higher than that of the processor class, is in the buffer, the transmission controller transmits data, which have had their destinations selected by the inter-destination arbitrator circuit and then have been selected by the inter-class arbitrator circuit in the order of severity of their required qualities.

* * * * *

UNITED STATES PATENT AND TRADEMARK OFFICE
CERTIFICATE OF CORRECTION

PATENT NO. : 9,606,945 B2  
APPLICATION NO. : 14/246468  
DATED : March 28, 2017  
INVENTOR(S) : Yoshida et al.

It is certified that error appears in the above-identified patent and that said Letters Patent is hereby corrected as shown below:

On the Title Page

Item (73), Assignee should read – "Panasonic Intellectual Property Management Co., Ltd., Osaka (JP)"

Signed and Sealed this
First Day of August, 2017

Joseph Matal
*Performing the Functions and Duties of the*
*Under Secretary of Commerce for Intellectual Property and*
*Director of the United States Patent and Trademark Office*